US012750279B2

(12) United States Patent
Robitzsch et al.

(10) Patent No.: US 12,750,279 B2
(45) Date of Patent: Sep. 29, 2026

(54) METHODS, ARCHITECTURES, APPARATUSES AND SYSTEMS FOR PROGRAMMABLE INTERFACE FOR SERVICE COMMUNICATION PROXY

(71) Applicant: InterDigital Patent Holdings, Inc., Wilmington, DE (US)

(72) Inventors: Sebastian Robitzsch, London (GB); Ulises Olvera-Hernandez, Saint-Lazare (CA)

(73) Assignee: INTERDIGITAL PATENT HOLDINGS, INC., Wilmington, DE (US)

( * ) Notice: Subject to any disclaimer, the term of this patent is extended or adjusted under 35 U.S.C. 154(b) by 226 days.

(21) Appl. No.: 18/712,085

(22) PCT Filed: Nov. 21, 2022

(86) PCT No.: PCT/US2022/050614
§ 371 (c)(1),
(2) Date: May 21, 2024

(87) PCT Pub. No.: WO2023/091764
PCT Pub. Date: May 25, 2023

(65) Prior Publication Data
US 2025/0023790 A1 Jan. 16, 2025

(30) Foreign Application Priority Data
Nov. 22, 2021 (EP) .................................... 21209599

(51) Int. Cl.
*H04L 41/14* (2022.01)
*H04L 67/02* (2022.01)

(52) U.S. Cl.
CPC .............. *H04L 41/14* (2013.01); *H04L 67/02* (2013.01)

(58) Field of Classification Search
None
See application file for complete search history.

(56) References Cited

U.S. PATENT DOCUMENTS

2020/0296660 A1 * 9/2020 Wang .................... H04W 48/16
2021/0120473 A1 * 4/2021 Yao .................. H04W 36/0079
(Continued)

FOREIGN PATENT DOCUMENTS

EP 3556083 B1 10/2021
WO 2020202043 A1 10/2020
(Continued)

OTHER PUBLICATIONS

"3rd Generation Partnership Project; Technical Specification Group Services and System Aspects; System architecture for the 5G System (5GS); Stage 2 (Release 16)", 3GPP TS 23.501 V16.5.1, Aug. 2020, 440 pages.
(Continued)

*Primary Examiner* — Anh Vu H Ly
(74) *Attorney, Agent, or Firm* — VOLPE KOENIG

(57) ABSTRACT

Procedures, methods, architectures, apparatuses, systems, devices, and computer program products directed to control throughput performance. In an embodiment, a service communication proxy (SCP) component comprises a programmable interface configured to transmit, to a wireless network element, a message comprising interface specification between a network function consumer and a network function producer.

20 Claims, 12 Drawing Sheets

(56) References Cited

U.S. PATENT DOCUMENTS

| | | | | |
|---|---|---|---|---|
| 2022/0338104 | A1* | 10/2022 | Son | H04W 12/06 |
| 2023/0147549 | A1* | 5/2023 | Singh | H04L 41/5041 709/223 |
| 2024/0015232 | A1* | 1/2024 | Rodrigo | H04L 67/142 |
| 2024/0373401 | A1* | 11/2024 | Chun | H04W 68/02 |
| 2025/0168155 | A1* | 5/2025 | Li | H04W 12/084 |

FOREIGN PATENT DOCUMENTS

| | | | |
|---|---|---|---|
| WO | WO 2023158781 | A1 | 8/2023 |
| WO | WO 2024015403 | A1 | 1/2024 |

OTHER PUBLICATIONS

"3rd Generation Partnership Project; Technical Specification Group Services and System Aspects; System architecture for the 5G System (5GS); Stage 2 (Release 17)", 3GPP TS 23.501 V17.2.0, Sep. 2021, 542 pages.

"3rd Generation Partnership Project; Technical Specification Group Services and System Aspects; System architecture for the 5G System (5GS); Stage 2 (Release 16)", 3GPP TS 23.501 V16.10.0, Sep. 2021, 453 pages.

"3rd Generation Partnership Project; Technical Specification Group Services and System Aspects; System architecture for the 5G System (5GS); Stage 2 (Release 15)", 3GPP TS 23.501 V15.12.0, Dec. 2020, 250 pages.

Apple et al., "Deprecating OS Id and OS App Id from URSP and ATSSS rules", 3GPP Tdoc S2-2000916, SA WG2 Meeting #136-AH, Incheon, South Korea, Jan. 13, 2020, 18 pages.

Wiggins, Adam, "The Twelve-Factor App", Opensource MIT License, Nov. 15, 2017, 3 pages.

* cited by examiner

METHODS, ARCHITECTURES, APPARATUSES AND SYSTEMS FOR PROGRAMMABLE INTERFACE FOR SERVICE COMMUNICATION PROXY

CROSS-REFERENCE TO RELATED APPLICATION

The application is a U.S. National Stage Application under 35 U.S.C. § 371 of International Patent Application PCT/US2022/050614, filed Nov. 21, 2022, which claims the benefit of, and/or priority to, EP Patent Application No. 21209599.6, filed Nov. 22, 2021, which is incorporated herein by reference.

FIELD OF THE INVENTION

The present disclosure is generally directed to the fields of communications, software and encoding, including, for example, to methods, architectures, apparatuses, systems directed to programmable interface for service communication proxy.

BACKGROUND

In the current Release 17 specification, four communication models are defined how consumers and producers communicate with each other, Model A, B, C or D. In all models the Network Repository Function (NRF) is at least part of this interaction either by a direct query by the consumer or through a delegated discovery. However, as the NRF is a 5G core (5GC) Network Function (NF) itself and since cloud native services must only implement logic to handle requests and responses related to providing the service to the end user (e.g. consumer), adding routing logic or other logic beyond the nature of the service it supports contradicts the nature of Service-based Architecture (SBA) and its cloud native proposition which clearly separates orchestration, routing and monitoring from the microservices (5GC) that implement control plane functionality to handle wireless transmit/receive unit (WTRU) attachment, session establishment and mobility requests (among others). As the NRF (as a 5GC NF) makes the routing decision with the Service Communication Proxy (SCP) executing it, the cloud native proposition is not fulfilled. Furthermore, in multi-vendor, multi-site scenarios, an NRF from Vendor A might not make the most appropriate decision on where to route consumer requests to when NFs are realized a set of microservices rather complex in their performance. Thus, as the SCP does not have an interface to control the Service Host Routing and Instance Selection Policies, the cloud native proposition of a 5G system lacks key architectural innovations to fully adopt the cloud principles SBA was supposed to bring.

There is a need for improving communication between consumer and producer

SUMMARY

In one embodiment, a method, implemented in a wireless transmit/receive unit (WTRU), may comprise a step of receiving first information comprises pre-configured route selection policies of the WTRU. The method may further comprise a step of determining, based on the first information, affinity information between a consumer function and a server function, wherein the affinity information indicates any of a network function identifier, a routing policy, a selection policy, affinity policy, and a context of affinity for a server function. The method may further comprise a step of transmitting, to a network element, a message indicating the affinity information between the consumer function and the server function.

The server function may be executed on the WTRU. The consumer function may be configured to transmit request messages to the WTRU, and the server function may be configured to response to request messages received by the WTRU.

Communication from the server function to the WTRU may be based on any of application layer protocol and communication from the consumer function to the WTRU may be based on any of application layer protocol.

The consumer function may communicate using non access stratum procedures and the server function may communicate using non access stratum procedures The selection policy may indicate under which condition an instance of a server function is selected, wherein the server function may be implemented as one or more instances. The affinity policy may indicate under which condition server function and consumer function instances maintain communication (e.g., continuously communicates) with each other until the selection policy is re-applied. The network function identifier may indicate an IP address or a Fully Qualified Domain Name. The context of affinity may be related to any of an identifier of consumer function or server function corresponding to an IP/MAC address, and PDU session identifier.

The WTRU may comprise one of a service communication proxy component and a network repository function. The WTRU may comprise a programmable interface for communicating between the consumer function and the server function. The programmable interface may be configured to transmit the message to a path computation element. The programmable interface may be configured to transmit the message to a service proxy manager.

In an embodiment, a WTRU, comprising a processor, a transceiver unit and a storage unit, may be configured to: receive first information comprises pre-configured route selection policies of the WTRU; determine, based on the first information, affinity information between a consumer function and a server function, wherein the affinity information indicates any of a network function identifier, a routing policy, a selection policy, affinity policy, and a context of affinity for a server function; and transmit, to a network element, a message indicating the affinity information between the consumer function and the server function.

The server function may be executed on the WTRU. The consumer function may be configured to transmit request messages to the WTRU. The server function may be configured to response to request messages received by the WTRU.

Communication from the server function to the WTRU may be based on any of application layer protocol, and communication from the consumer function to the WTRU may be based on any of application layer protocol.

The consumer function may communicate using non access stratum procedures; and the server function may communicate using non access stratum procedures The selection policy may indicate under which condition an instance of a server function is selected, wherein the server function is implemented as one or more instances. The affinity policy may indicate under which condition server function and consumer function instances maintain communication (e.g., continuously communicates) with each other until the selection policy is re-applied. The network function identifier may indicate an IP address or a Fully Qualified Domain Name. The context of affinity may be related to any of an identifier of consumer function or server function corresponding to an IP/MAC address, and PDU session identifier.

The WTRU may comprise one of a service communication proxy component and a network repository function. The WTRU may comprise a programmable interface for communicating between the consumer function and the server function. The programmable interface may be configured to transmit the message to a path computation element. The programmable interface may be configured to transmit the message to a service proxy manager.

BRIEF DESCRIPTION OF THE DRAWINGS

A more detailed understanding may be had from the detailed description below, given by way of example in conjunction with drawings appended hereto. Figures in such drawings, like the detailed description, are examples. As such, the Figures (FIGs.) and the detailed description are not to be considered limiting, and other equally effective examples are possible and likely. Furthermore, like reference numerals ("ref") in the FIGs. indicate like elements, and wherein.

DETAILED DESCRIPTION

Figure 1A:
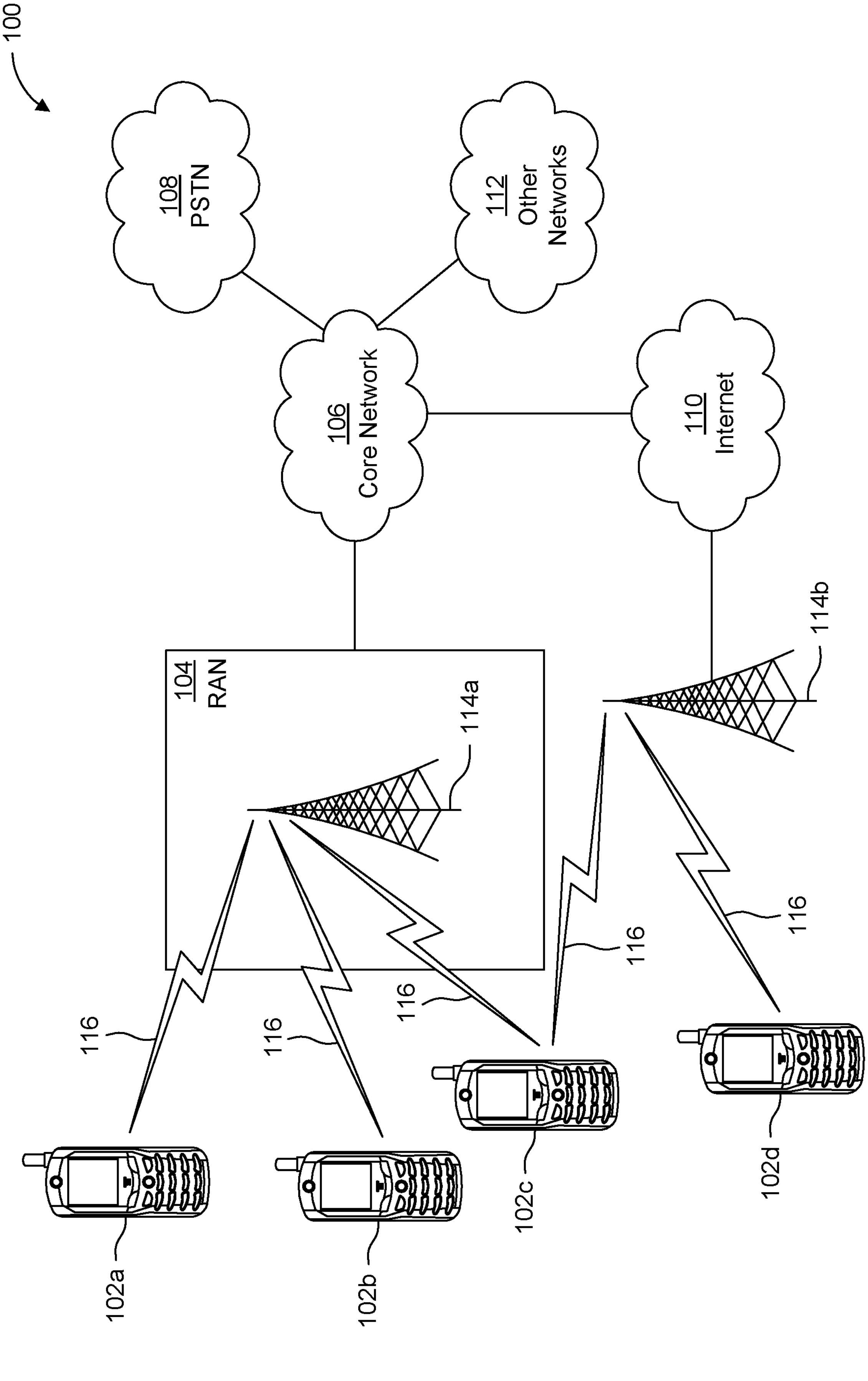
FIG. 1A is a system diagram illustrating an example communications system.

In the following detailed description, numerous specific details are set forth to provide a thorough understanding of embodiments and/or examples disclosed herein. However, it will be understood that such embodiments and examples may be practiced without some or all of the specific details set forth herein. In other instances, well-known methods, procedures, components and circuits have not been described in detail, so as not to obscure the following description. Further, embodiments and examples not specifically described herein may be practiced in lieu of, or in combination with, the embodiments and other examples described, disclosed or otherwise provided explicitly, implicitly and/or inherently (collectively "provided") herein. Although various embodiments are described and/or claimed herein in which an apparatus, system, device, etc. and/or any element thereof carries out an operation, process, algorithm, function, etc. and/or any portion thereof, it is to be understood that any embodiments described and/or claimed herein assume that any apparatus, system, device, etc. and/or any element thereof is configured to carry out any operation, process, algorithm, function, etc. and/or any portion thereof.

Example Communications System

The methods, apparatuses and systems provided herein are well-suited for communications involving both wired and wireless networks. An overview of various types of wireless devices and infrastructure is provided with respect to FIGS. 1A-1D, where various elements of the network may utilize, perform, be arranged in accordance with and/or be adapted and/or configured for the methods, apparatuses and systems provided herein.

FIG. TA is a system diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail (ZT) unique-word (UW) discreet Fourier transform (DFT) spread OFDM (ZT UW DTS-s OFDM), unique word OFDM (UW-OFDM), resource block-filtered OFDM, filter bank multicarrier (FBMC), and the like.

As shown in FIG. TA, the communications system 100 may include wireless transmit/receive units (WTRUs) 102*a*, 102*b*, 102*c*, 102*d*, a radio access network (RAN) 104/113, a core network (CN) 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102*a*, 102*b*, 102*c*, 102*d* may be any type of device configured to operate and/or communicate in a wireless environment. By way of example, the WTRUs 102*a*, 102*b*, 102*c*, 102*d*, any of which may be referred to as a "station" and/or a "STA", may be configured to transmit and/or receive wireless signals and may include (or be) a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102*a*, 102*b*, 102*c* and 102*d* may be interchangeably referred to as a UE.

The communications systems 100 may also include a base station 114*a* and/or a base station 114*b*. Each of the base stations 114*a*, 114*b* may be any type of device configured to wirelessly interface with at least one of the WTRUs 102*a*, 102*b*, 102*c*, 102*d*, e.g., to facilitate access to one or more communication networks, such as the CN 106/115, the Internet 110, and/or the networks 112. By way of example, the base stations 114*a*, 114*b* may be any of a base transceiver station (BTS), a Node-B (NB), an eNode-B (eNB), a Home Node-B (HNB), a Home eNode-B (HeNB), a gNode-B (gNB), a NR Node-B (NR NB), a site controller, an access point (AP), a wireless router, and the like. While the base stations 114*a*, 114*b* are each depicted as a single element, it will be appreciated that the base stations 114*a*, 114*b* may include any number of interconnected base stations and/or network elements.

The base station 114*a* may be part of the RAN 104/113, which may also include other base stations and/or network elements (not shown), such as a base station controller (BSC), a radio network controller (RNC), relay nodes, etc. The base station 114*a* and/or the base station 114*b* may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114*a* may be divided into three sectors. Thus, in an embodiment, the base station 114*a* may include three transceivers, i.e., one for each sector of the cell. In an embodiment, the base station 114*a* may employ multiple-input multiple output (MIMO) technology and may utilize multiple transceivers for each or any sector of the cell. For example, beamforming may be used to transmit and/or receive signals in desired spatial directions.

The base stations 114*a*, 114*b* may communicate with one or more of the WTRUs 102*a*, 102*b*, 102*c*, 102*d* over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114*a* in the RAN 104/113 and the WTRUs 102*a*, 102*b*, 102*c* may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In an embodiment, the base station 114*a* and the WTRUs 102*a*, 102*b*, 102*c* may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114*a* and the WTRUs 102*a*, 102*b*, 102*c* may implement a radio technology such as NR Radio Access, which may establish the air interface 116 using New Radio (NR).

In an embodiment, the base station 114*a* and the WTRUs 102*a*, 102*b*, 102*c* may implement multiple radio access technologies. For example, the base station 114*a* and the WTRUs 102*a*, 102*b*, 102*c* may implement LTE radio access and NR radio access together, for instance using dual connectivity (DC) principles. Thus, the air interface utilized by WTRUs 102*a*, 102*b*, 102*c* may be characterized by multiple types of radio access technologies and/or transmissions sent to/from multiple types of base stations (e.g., an eNB and a gNB).

In an embodiment, the base station 114*a* and the WTRUs 102*a*, 102*b*, 102*c* may implement radio technologies such as IEEE 802.11 (i.e., Wireless Fidelity (Wi-Fi), IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114*b* in FIG. 1A may be a wireless router, Home Node-B, Home eNode-B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In an embodiment, the base station 114*b* and the WTRUs 102*c*, 102*d* may implement a radio technology such as IEEE 802.11 to establish a wireless local area network (WLAN). In an embodiment, the base station 114*b* and the WTRUs 102*c*, 102*d* may implement a radio technology such as IEEE 802.15 to establish a wireless personal area network (WPAN). In an embodiment, the base station 114*b* and the WTRUs 102*c*, 102*d* may utilize a cellular-based RAT (e.g., WCDMA, CDMA2000, GSM, LTE, LTE-A, LTE-A Pro, NR, etc.) to establish any of a small cell, picocell or femtocell. As shown in FIG. 1A, the base station 114*b* may have a direct connection to the Internet 110. Thus, the base station 114*b* may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102*a*, 102*b*, 102*c*, 102*d*. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing an NR radio technology, the CN 106/115 may also be in communication with another RAN (not shown) employing any of a GSM, UMTS, CDMA 2000, WiMAX, E-UTRA, or Wi-Fi radio technology.

The CN 106/115 may also serve as a gateway for the WTRUs 102*a*, 102*b*, 102*c*, 102*d* to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/114 or a different RAT.

Some or all of the WTRUs 102*a*, 102*b*, 102*c*, 102*d* in the communications system 100 may include multi-mode capabilities (e.g., the WTRUs 102*a*, 102*b*, 102*c*, 102*d* may include multiple transceivers for communicating with different wireless networks over different wireless links). For example, the WTRU 102*c* shown in FIG. 1A may be configured to communicate with the base station 114*a*, which may employ a cellular-based radio technology, and with the base station 114*b*, which may employ an IEEE 802 radio technology.

Figure 1B:
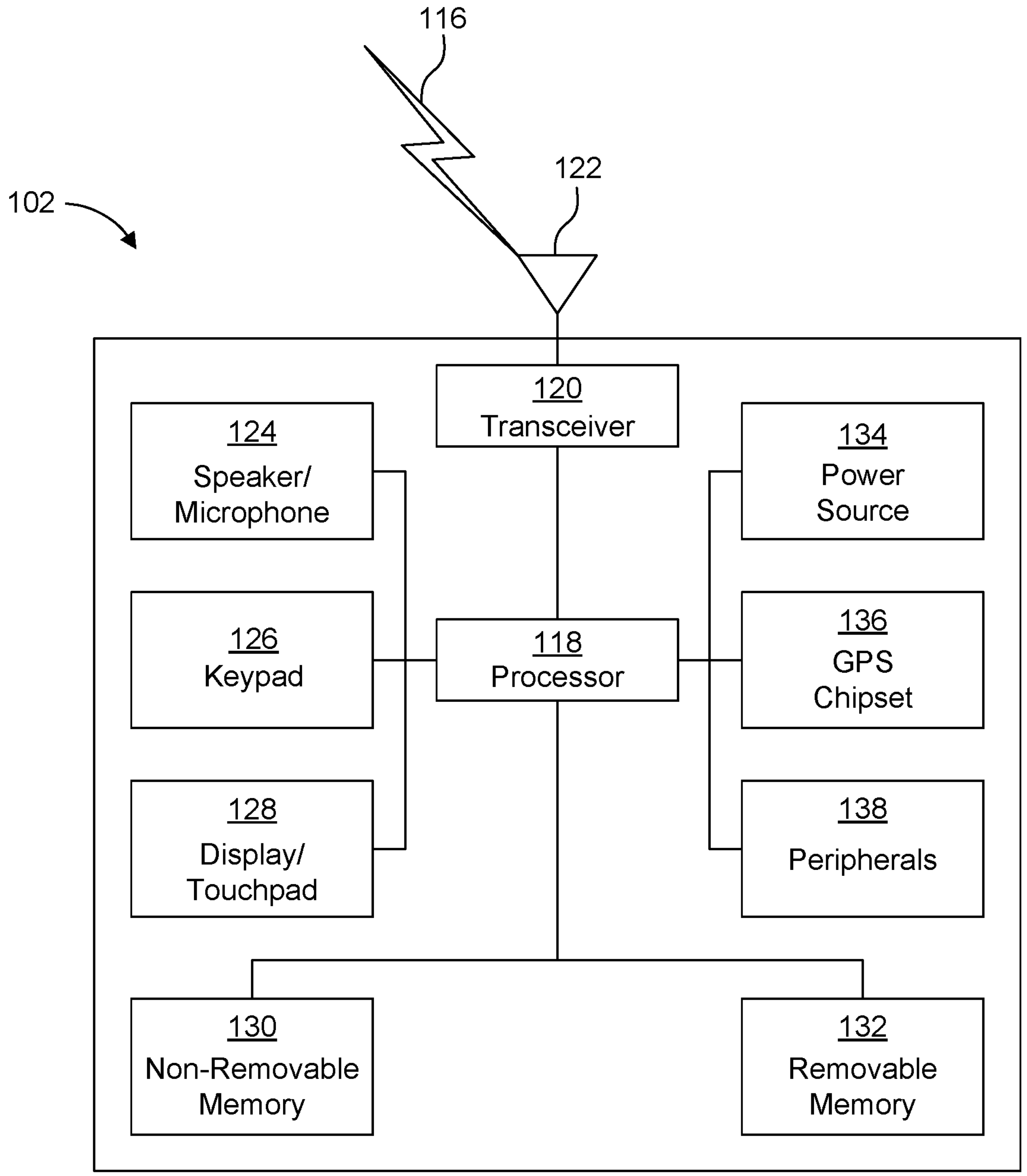
FIG. 1B is a system diagram illustrating an example wireless transmit/receive unit (WTRU) that may be used within the communications system illustrated in FIG. TA.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other elements/peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together, e.g., in an electronic package or chip.

The transmit/receive element 122 may be configured to transmit signals to, or receive signals from, a base station (e.g., the base station 114*a*) over the air interface 116. For example, in an embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In an embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. For example, the WTRU 102 may employ MIMO technology. Thus, in an embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114*a*, 114*b*) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other elements/peripherals 138, which may include one or more software and/or hardware modules/units that provide additional features, functionality and/or wired or wireless connectivity. For example, the elements/peripherals 138 may include an accelerometer, an e-compass, a satellite transceiver, a digital camera (e.g., for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a virtual reality and/or augmented reality (VR/AR) device, an activity tracker, and the like. The elements/peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the uplink (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the uplink (e.g., for transmission) or the downlink (e.g., for reception)).

Figure 1C:
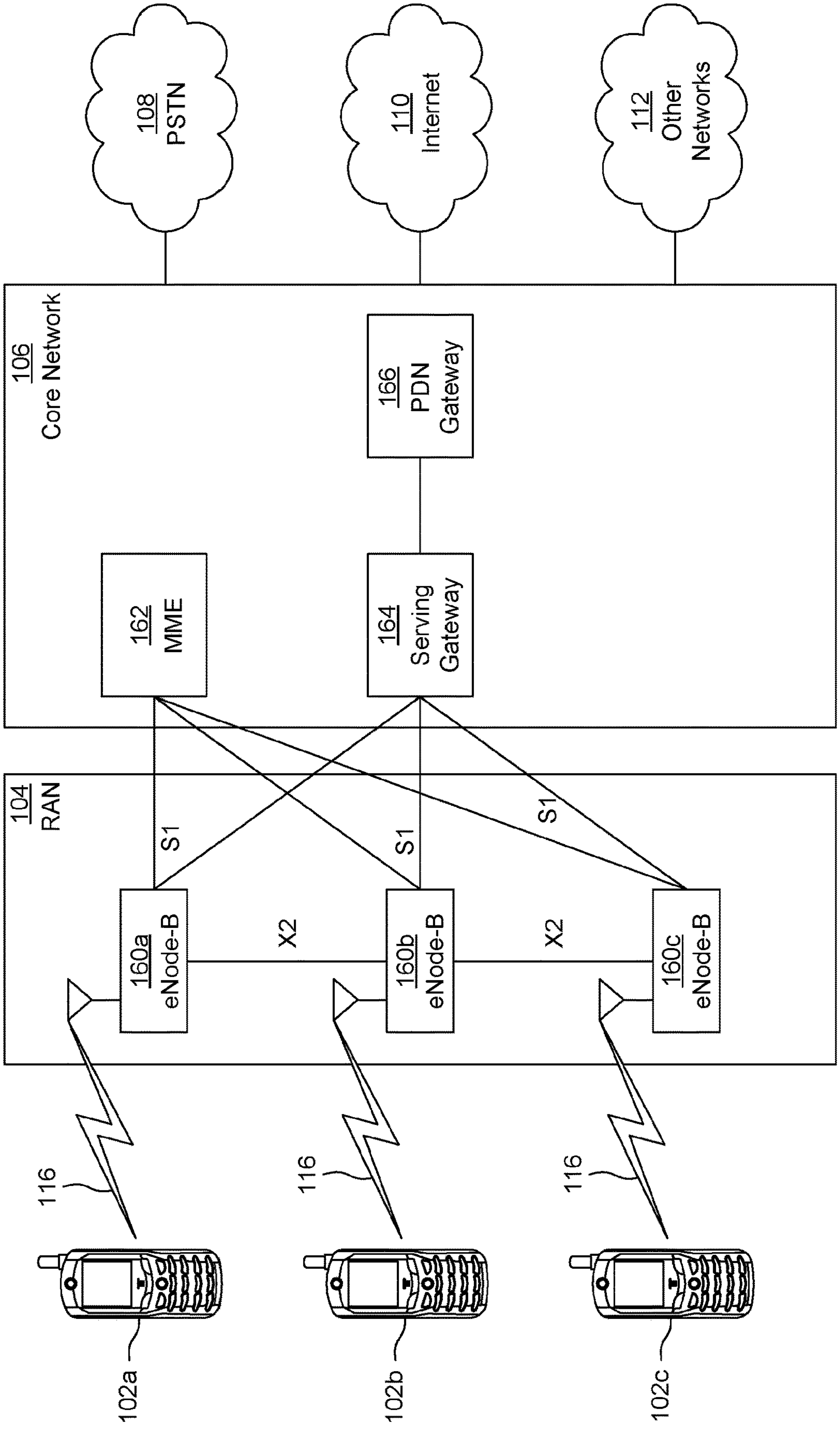
FIG. 1C is a system diagram illustrating an example radio access network (RAN) and an example core network (CN) that may be used within the communications system illustrated in FIG. TA.

FIG. 1C is a system diagram illustrating the RAN 104 and the CN 106 according to an embodiment. As noted above, the RAN 104 may employ an E-UTRA radio technology to communicate with the WTRUs 102*a*, 102*b*, and 102*c* over the air interface 116. The RAN 104 may also be in communication with the CN 106.

The RAN 104 may include eNode-Bs 160*a*, 160*b*, 160*c*, though it will be appreciated that the RAN 104 may include any number of eNode-Bs while remaining consistent with an embodiment. The eNode-Bs 160*a*, 160*b*, 160*c* may each include one or more transceivers for communicating with the WTRUs 102*a*, 102*b*, 102*c* over the air interface 116. In an embodiment, the eNode-Bs 160*a*, 160*b*, 160*c* may implement MIMO technology. Thus, the eNode-B 160*a*, for example, may use multiple antennas to transmit wireless signals to, and receive wireless signals from, the WTRU 102*a*.

Each of the eNode-Bs 160*a*, 160*b*, and 160*c* may be associated with a particular cell (not shown) and may be configured to handle radio resource management decisions, handover decisions, scheduling of users in the uplink (UL) and/or downlink (DL), and the like. As shown in FIG. 1C, the eNode-Bs 160*a*, 160*b*, 160*c* may communicate with one another over an X2 interface.

The CN 106 shown in FIG. 1C may include a mobility management entity (MME) 162, a serving gateway (SGW) 164, and a packet data network (PDN) gateway (PGW) 166. While each of the foregoing elements are depicted as part of the CN 106, it will be appreciated that any one of these elements may be owned and/or operated by an entity other than the CN operator.

The MME 162 may be connected to each of the eNode-Bs 160*a*, 160*b*, and 160*c* in the RAN 104 via an S1 interface and may serve as a control node. For example, the MME 162 may be responsible for authenticating users of the WTRUs 102*a*, 102*b*, 102*c*, bearer activation/deactivation, selecting a particular serving gateway during an initial attach of the WTRUs 102*a*, 102*b*, 102*c*, and the like. The MME 162 may provide a control plane function for switching between the RAN 104 and other RANs (not shown) that employ other radio technologies, such as GSM and/or WCDMA.

The SGW 164 may be connected to each of the eNode-Bs 160*a*, 160*b*, 160*c* in the RAN 104 via the S1 interface. The SGW 164 may generally route and forward user data packets to/from the WTRUs 102*a*, 102*b*, 102*c*. The SGW 164 may perform other functions, such as anchoring user planes during inter-eNode-B handovers, triggering paging when DL data is available for the WTRUs 102*a*, 102*b*, 102*c*, managing and storing contexts of the WTRUs 102*a*, 102*b*, 102*c*, and the like.

The SGW 164 may be connected to the PGW 166, which may provide the WTRUs 102*a*, 102*b*, 102*c* with access to packet-switched networks, such as the Internet 110, to facilitate communications between the WTRUs 102*a*, 102*b*, 102*c* and IP-enabled devices.

The CN 106 may facilitate communications with other networks. For example, the CN 106 may provide the WTRUs 102*a*, 102*b*, 102*c* with access to circuit-switched networks, such as the PSTN 108, to facilitate communications between the WTRUs 102*a*, 102*b*, 102*c* and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102*a*, 102*b*, 102*c* with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in infrastructure basic service set (BSS) mode may have an access point (AP) for the BSS and one or more stations (STAs) associated with the AP. The AP may have an access or an interface to a distribution system (DS) or another type of wired/wireless network that carries traffic into and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier sense multiple access with collision avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High throughput (HT) STAs may use a 40 MHz wide channel for communication, for example, via a combination of the primary 20 MHz channel with an adjacent or nonadjacent 20 MHz channel to form a 40 MHz wide channel.

Very high throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse fast fourier transform (IFFT) processing, and time domain processing, may be done on each stream separately. The streams may be mapped on to the two 80 MHz channels, and the data may be transmitted by a transmitting STA. At the receiver of the receiving STA, the above-described operation for the 80+80 configuration may be reversed, and the combined data may be sent to a medium access control (MAC) layer, entity, etc.

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV white space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support meter type control/machine-type communications (MTC), such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or network allocation vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
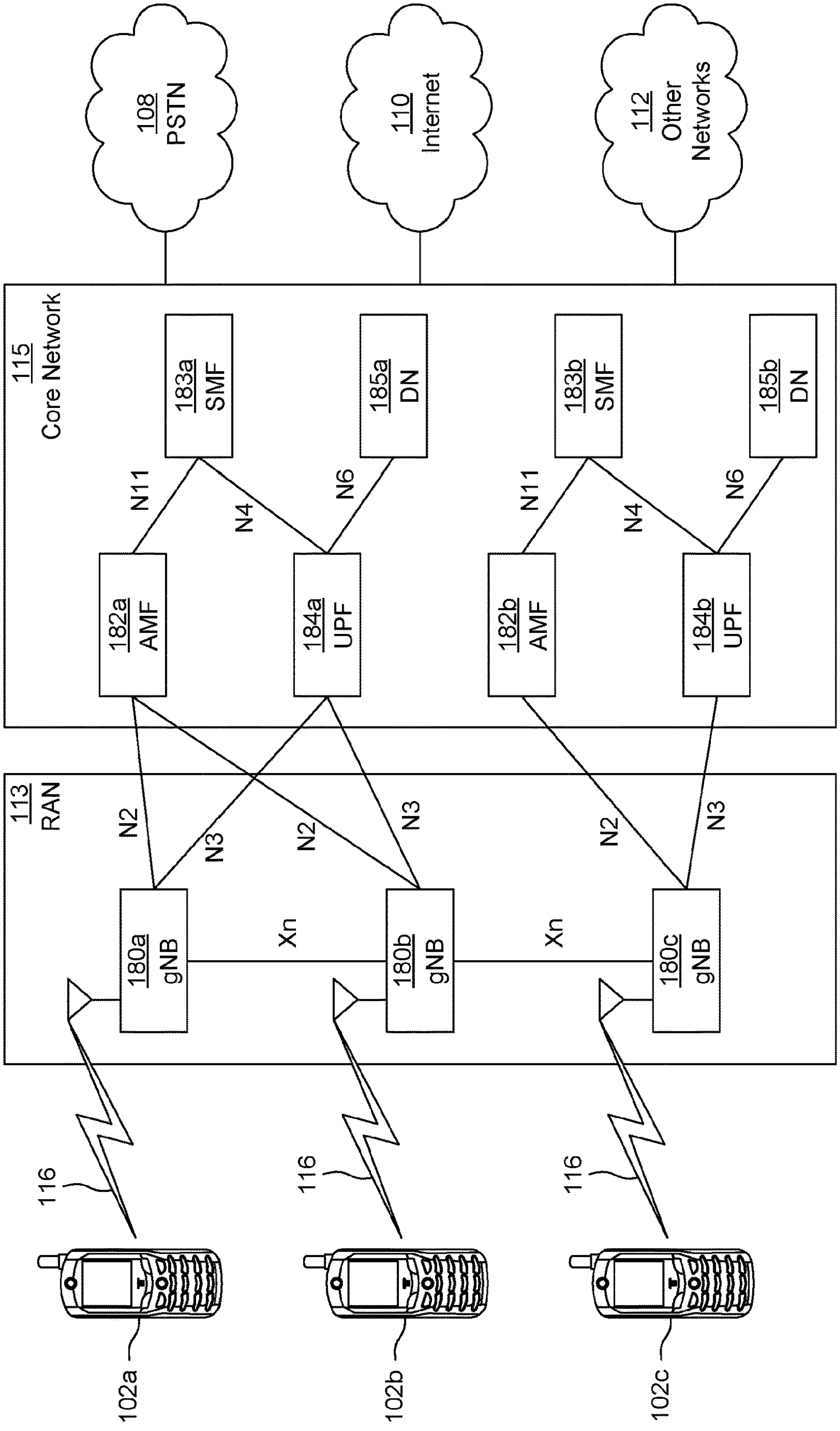
FIG. 1D is a system diagram illustrating a further example RAN and a further example CN that may be used within the communications system illustrated in FIG. TA.

FIG. 1D is a system diagram illustrating the RAN 113 and the CN 115 according to an embodiment. As noted above, the RAN 113 may employ an NR radio technology to communicate with the WTRUs 102*a*, 102*b*, 102*c* over the air interface 116. The RAN 113 may also be in communication with the CN 115.

The RAN 113 may include gNBs 180*a*, 180*b*, 180*c*, though it will be appreciated that the RAN 113 may include any number of gNBs while remaining consistent with an embodiment. The gNBs 180*a*, 180*b*, 180*c* may each include one or more transceivers for communicating with the WTRUs 102*a*, 102*b*, 102*c* over the air interface 116. In an embodiment, the gNBs 180*a*, 180*b*, 180*c* may implement MIMO technology. For example, gNBs 180*a*, 180*b* may utilize beamforming to transmit signals to and/or receive signals from the WTRUs 102*a*, 102*b*, 102*c*. Thus, the gNB 180*a*, for example, may use multiple antennas to transmit wireless signals to, and/or receive wireless signals from, the WTRU 102*a*. In an embodiment, the gNBs 180*a*, 180*b*, 180*c* may implement carrier aggregation technology. For example, the gNB 180*a* may transmit multiple component carriers to the WTRU 102*a* (not shown). A subset of these component carriers may be on unlicensed spectrum while the remaining component carriers may be on licensed spectrum. In an embodiment, the gNBs 180*a*, 180*b*, 180*c* may implement Coordinated Multi-Point (CoMP) technology. For example, WTRU 102*a* may receive coordinated transmissions from gNB 180*a* and gNB 180*b* (and/or gNB 180*c*).

The WTRUs 102*a*, 102*b*, 102*c* may communicate with gNBs 180*a*, 180*b*, 180*c* using transmissions associated with a scalable numerology. For example, OFDM symbol spacing and/or OFDM subcarrier spacing may vary for different transmissions, different cells, and/or different portions of the wireless transmission spectrum. The WTRUs 102*a*, 102*b*, 102*c* may communicate with gNBs 180*a*, 180*b*, 180*c* using subframe or transmission time intervals (TTIs) of various or scalable lengths (e.g., including a varying number of OFDM symbols and/or lasting varying lengths of absolute time).

The gNBs 180*a*, 180*b*, 180*c* may be configured to communicate with the WTRUs 102*a*, 102*b*, 102*c* in a standalone configuration and/or a non-standalone configuration. In the standalone configuration, WTRUs 102*a*, 102*b*, 102*c* may communicate with gNBs 180*a*, 180*b*, 180*c* without also accessing other RANs (e.g., such as eNode-Bs 160*a*, 160*b*, 160*c*). In the standalone configuration, WTRUs 102*a*, 102*b*, 102*c* may utilize one or more of gNBs 180*a*, 180*b*, 180*c* as a mobility anchor point. In the standalone configuration, WTRUs 102*a*, 102*b*, 102*c* may communicate with gNBs 180*a*, 180*b*, 180*c* using signals in an unlicensed band. In anon-standalone configuration WTRUs 102*a*, 102*b*, 102*c* may communicate with/connect to gNBs 180*a*, 180*b*, 180*c* while also communicating with/connecting to another RAN such as eNode-Bs 160*a*, 160*b*, 160*c*. For example, WTRUs 102*a*, 102*b*, 102*c* may implement DC principles to communicate with one or more gNBs 180*a*, 180*b*, 180*c* and one or more eNode-Bs 160*a*, 160*b*, 160*c* substantially simultaneously. In the non-standalone configuration, eNode-Bs 160*a*, 160*b*, 160*c* may serve as a mobility anchor for WTRUs 102*a*, 102*b*, 102*c* and gNBs 180*a*, 180*b*, 180*c* may provide additional coverage and/or throughput for servicing WTRUs 102*a*, 102*b*, 102*c*.

Each of the gNBs 180*a*, 180*b*, 180*c* may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards user plane functions (UPFs) 184*a*, 184*b*, routing of control plane information towards access and mobility management functions (AMFs) 182*a*, 182*b*, and the like. As shown in FIG. 1D, the gNBs 180*a*, 180*b*, 180*c* may communicate with one another over an Xn interface.

The CN 115 shown in FIG. 1D may include at least one AMF 182*a*, 182*b*, at least one UPF 184*a*, 184*b*, at least one session management function (SMF) 183*a*, 183*b*, and at least one Data Network (DN) 185*a*, 185*b*. While each of the foregoing elements are depicted as part of the CN 115, it will be appreciated that any of these elements may be owned and/or operated by an entity other than the CN operator.

The AMF 182*a*, 182*b* may be connected to one or more of the gNBs 180*a*, 180*b*, 180*c* in the RAN 113 via an N2 interface and may serve as a control node. For example, the AMF 182*a*, 182*b* may be responsible for authenticating users of the WTRUs 102*a*, 102*b*, 102*c*, support for network slicing (e.g., handling of different protocol data unit (PDU) sessions with different requirements), selecting a particular SMF 183*a*, 183*b*, management of the registration area, termination of NAS signaling, mobility management, and the like. Network slicing may be used by the AMF 182*a*, 182*b*, e.g., to customize CN support for WTRUs 102*a*, 102*b*, 102*c* based on the types of services being utilized WTRUs 102*a*, 102*b*, 102*c*. For example, different network slices may be established for different use cases such as services relying on ultra-reliable low latency (URLLC) access, services relying on enhanced massive mobile broadband (eMBB) access, services for MTC access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as Wi-Fi.

The SMF 183*a*, 183*b* may be connected to an AMF 182*a*, 182*b* in the CN 115 via an N11 interface. The SMF 183*a*, 183*b* may also be connected to a UPF 184*a*, 184*b* in the CN 115 via an N4 interface. The SMF 183*a*, 183*b* may select and control the UPF 184*a*, 184*b* and configure the routing of traffic through the UPF 184*a*, 184*b*. The SMF 183*a*, 183*b* may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184*a*, 184*b* may be connected to one or more of the gNBs 180*a*, 180*b*, 180*c* in the RAN 113 via an N3 interface, which may provide the WTRUs 102*a*, 102*b*, 102*c* with access to packet-switched networks, such as the Internet 110, e.g., to facilitate communications between the WTRUs 102*a*, 102*b*, 102*c* and IP-enabled devices. The UPF 184, 184*b* may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102*a*, 102*b*, 102*c* with access to the other networks 112, which may include other wired and/or wireless networks that are owned and/or operated by other service providers. In an embodiment, the WTRUs 102*a*, 102*b*, 102*c* may be connected to a local Data Network (DN) 185*a*, 185*b* through the UPF 184*a*, 184*b* via the N3 interface to the UPF 184*a*, 184*b* and an N6 interface between the UPF 184*a*, 184*b* and the DN 185*a*, 185*b*.

In view of FIGS. 1A-1D, and the corresponding description of FIGS. 1A-1D, one or more, or all, of the functions described herein with regard to any of: WTRUs 102*a-d*, base stations 114*a-b*, eNode-Bs 160*a-c*, MME 162, SGW 164, PGW 166, gNBs 180*a-c*, AMFs 182*a-b*, UPFs 184*a-b*, SMFs 183*a-b*, DNs 185*a-b*, and/or any other element(s)/device(s) described herein, may be performed by one or more emulation elements/devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device (e.g., a network node) may be directly coupled to another device for purposes of testing and/or may performing testing using over-the-air wireless communications.

The one or more emulation devices may perform the one or more, including all, functions while not being implemented/deployed as part of a network node (e.g., wired and/or wireless communication network). For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

Example of Cloud Principles in 5G Network

3GPP's Release 15 introduced the paradigm shift in the system architecture adopting service-centric system and communication concept commonly referred to as Service-based Architecture (SBA). For the first time in mobile telecommunication systems, two functions in the control plane are not bound to each other anymore allowing any function to reach another one if desired without the standard prohibiting it. Furthermore, the SBA may enforce the usage of the stateless application protocol Hyper-text Transfer Protocol (HTTP) Version 2 (HTTP/2) with JSON-encoded payloads combined with CRUD/RESTful software engineering practices. This sort of interface is declared in 3GPP as a Service-based Interface (SBI).

With 3GPP following SBA principles, the realization of SBI-enabled 5G Network Function (NF) may follow the 12-factor app methodology, aka microservices, which originated from the cloud community and outlines how applications should be implemented to be cloud native. Cloud native application may be composed of a set of microservices that implement parts of the overall application with key functionality being outsourced such as logging, state management, provisioning and lifecycle management. Additionally, cloud native applications may follow a (e.g., strict agile) development process where there is a single code base for unit and integration tests across a range of environments (e.g., aka DevOps paradigm).

In Release 16, 3GPP introduced a new 5G Core (5GC) network entity, responsible for routing packets between SBI-enabled NFs and a signaling function: a Service Communication Proxy (SCP). The SCP may take over the task of routing packets between SBI-enabled NFs. Since the introduction of the SCP, this component may be an optional one in the system architecture meaning there is various options to choose from when realizing the communication of among 5GC NFs. The introduction of the SCP component may mark an important milestone in realizing a cloud native architecture for 5G, as routing packets among microservices (e.g., officially) becomes an "outsourced" delegated functionality implemented by the SCP.

Example of Communication Design Patterns in 5G Systems

Figure 2:
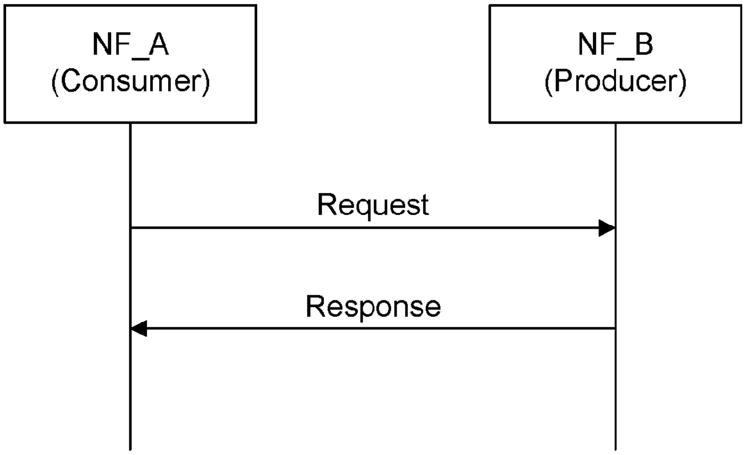
FIG. 2 is a diagram illustrating an example of a "request-response" network function service interaction between a network functions service consumer and a network function service producer.

With the introduction of SBA and SBIs for 5GNFs, the communication pattern between two network functions has been simplified to the usage of HTTP/2, without any strict binding on which NFs may communicate with each other. As shown in FIG. 2, a "Request-response" NF Service is illustrated. FIG. 2 is extracted from document 3GPP TS 23.501 version 16.5.1 Release 16, Section 7.1.2, FIG. 7.1.2-1. FIG. 2 depicts an interaction defined between a consumer and a producer. The terms consumer and producer respectively indicate a requester and a responder. The term consumer may be interchangeably referred to as a consumer function. The term producer (e.g., server) may be interchangeably referred to as a producer (e.g., server) function. Both consumer and producer depicted in FIG. 2 represent a network function (NF) and not the actual instances in the deployment. A network function may be any of a consumer function or a producer (e.g., server) function. This follows the SBA methodology of how an architecture and its communication should be designed and specified.

When moving to a microservice software approach to realize 5GC NFs, 3GPP may add the ability to the system to bind consumer and producer instances in varies ways enabling control over the routing (i.e., SCP) of initial and subsequent HTTP transactions between instances. Reasons for such descriptive control of the 5GC itself is the challenge to handle requests for a context that is unknown to the (e.g., specific) producer instance that received a request. Any state transfer into a new instance may come with additional network load and delay in responding to the request. Thus, 3GPP may define the ability for producers to add binding indicating for subsequent requests by a consumer allowing the SCP to ensure the delivery of HTTP transactions to the instances that are handling a specific context of state, e.g., a specific WTRU attachment or PDU session request.

Figure 3:
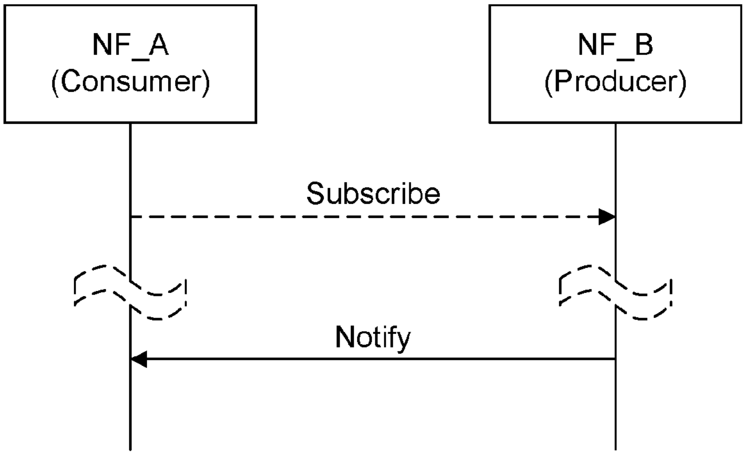
FIG. 3 is a diagram illustrating an example of a "Subscribe-Notify" network function service interaction between a network functions service consumer and a network function service producer.

As shown in FIG. 3, HTTP transactions may allow consumers to create state within the producer in order to be notified about future events. As shown in FIG. 3, a "Subscribe-Notify" NF Service is illustrated. FIG. 3 is extracted from document 3GPP TS 23.501 version 16.5.1 Release 16, Section 7.1.2, FIG. 7.1.2-2. 3GPP defines the ability for consumers to communicate binding information to the request telling the producer where to send the notifications to. This "notification endpoint", (e.g., "Notification Target Address", Section 7.1.2) is then used by the producer to send any requested notification to the list of consumers that requested it. The standard defines three subscription models to communicate aforementioned notification target address, e.g., explicit subscription, implicit subscription and default notification endpoint. While Explicit and Implicit Subscription models may utilize (e.g., dedicated) HTTP transactions, the default notification endpoint mode may utilize a NF registration with a network repository function (NRF) to communicate any subscriptions upfront. The actual notification then utilizes a dedicated HTTP transaction to convey the subscribed event(s).

With respect to the routing of packets, the binding indication provided by either consumer or producers is expected to be taken into consideration by an SCP when routing the notifications from producers to consumers.

Based on the communication design patterns defined in document 3GPP, "System architecture for the 5G System (5GS)", 23.501, Release 17, the standard may add the ability to control the scope of instances the SCP may possibly route the consumer packet to. This may be entirely controlled by the NRF and may allow to indicate the level of binding consumer and producer, e.g., NF Service Instance, NF Service Set, NF Instance or NF Set, as depicts in Table 6.3.1.0.-1 of 3GPP TS 23.501, Release 17.

Example of Name-based Routing (NbR) Architecture/System

Figure 4:
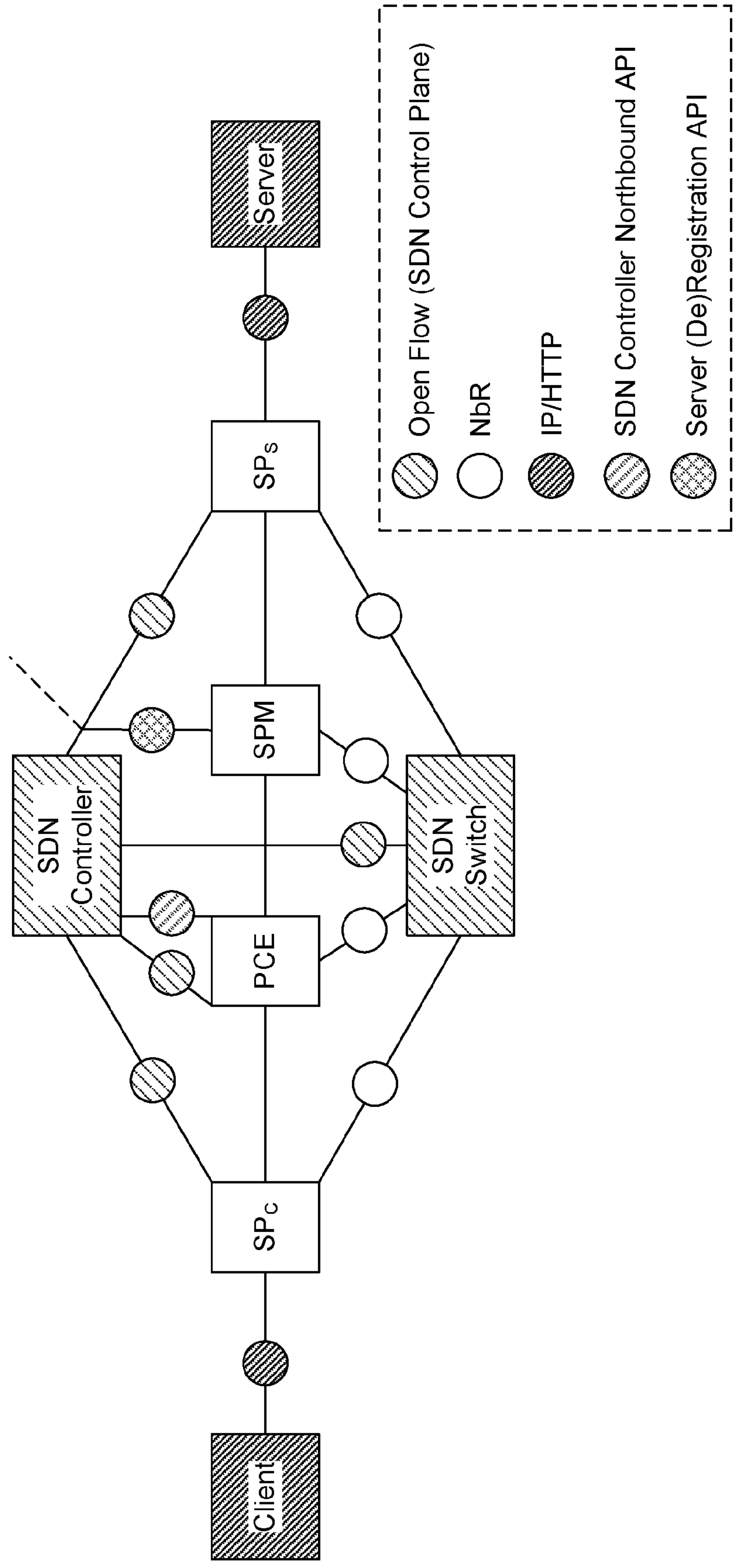
FIG. 4 is a diagram illustrating an example of a Named-based Routing architecture.

Document 3GPP, TS23.501, Release 17, lists three deployment options of the SCP, i.e., Service Mesh, Independent Service Units and Name-based Routing (NbR). The core objective of Name-base Routing (NbR) may be the ability to offer transparent service routing for HTTP services, while preserving the nature of the communication stack of endpoints utilizing the IP suite. Internally, NbR may utilize Information-centric-networking (ICN) (publish/subscribe) concepts for decoupling the information space of who has the information from the underlying routing. NbR (e.g., seamlessly) may integrate with an SDN-based switching fabric, e.g., OpenFlow 1.3 and above. NbR may be composed of Service Proxies (SPs) at each side of the client-server communication translating the IP world into ICN and vice versa and the path computation element (PCE) performing the matching of publishers to subscribers and the calculation of the path through the network. At shown in FIG. 4, a system architecture of NbR may be composed of any of the NbR components: the SP serving the client ($SP_C$), the SP serving the server (SPs), and the PCE. Additionally, the SDN switching fabric and interfaces are also illustrated for completion purposes. Furthermore, the NbR architecture illustrated in FIG. 4 may offer an interface for registering/deregistering servers against/from the routing layer. This interface may be provided by a Service Proxy Manager (SPM) and may be realized as a RESTful Application Program interface (API)

Example of Service Communication Proxy Deployment and Operation Considerations

Figure 5:
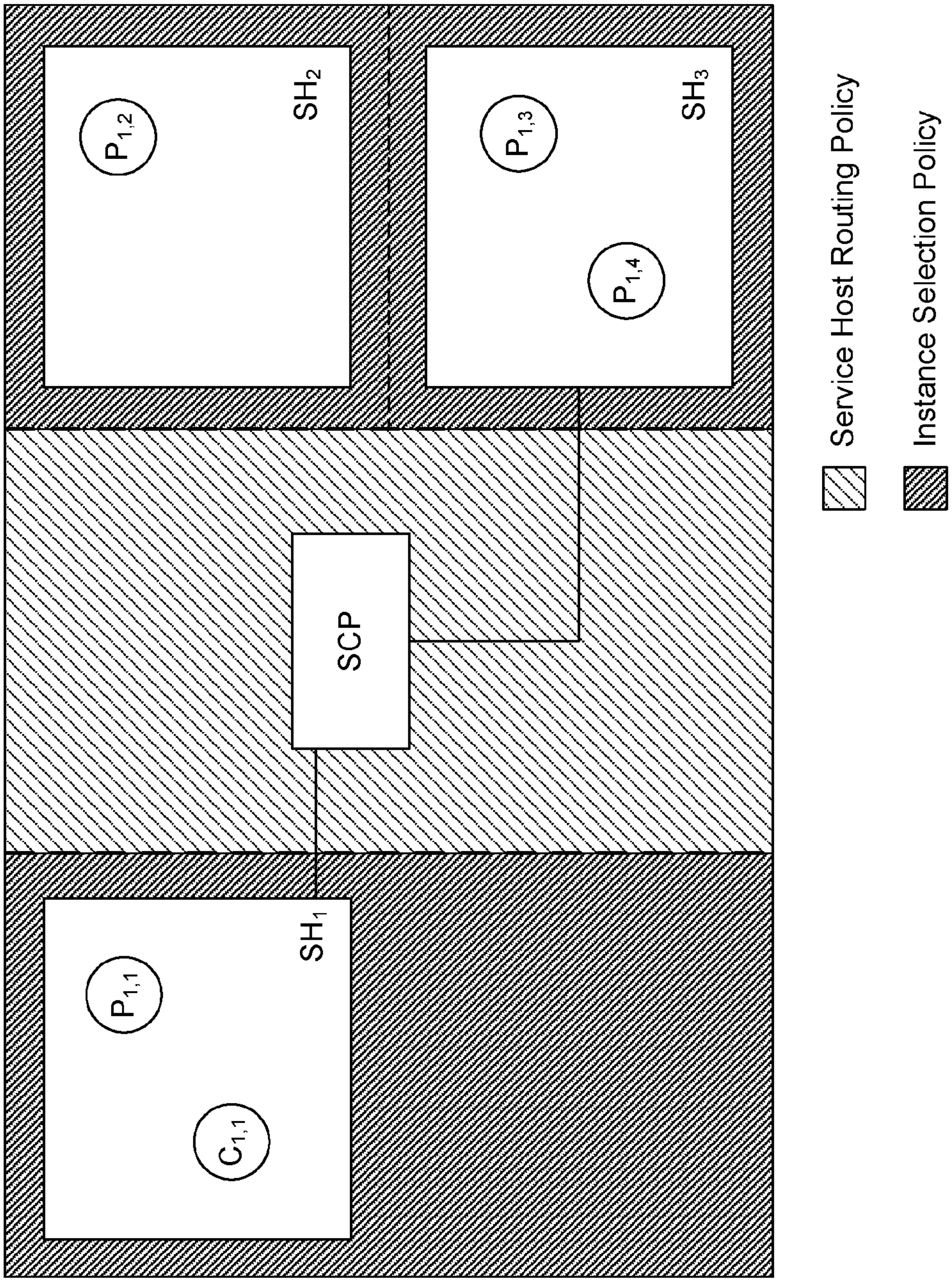
FIG. 5 is a diagram illustrating an example of a service proxy deployment and operation.

Across all three SCP deployment options in 3GPP TS 23.501, the SCP may interconnect one or more consumer or producer instances over a routable network with another instance or set of instances. FIG. 5 depicts a non-limited example of a set of service hosts (SHs), namely $SH_1$, $SH_2$ and $SH_3$, which are compute nodes allowing to host 5GC NFs and an SCP that interconnects them via a routable network. Each SH then hosts consumers C and producers P that are denoted by their NF type (AMF, SMF, PCE, . . . ) and the instance of this type that has been provisioned. As shown in FIG. 5, there is one consumer and one producer. The consumer exists as a single instance, namely $C_{1,1}$ and four producer instances exist, namely $P_{1,1}$ $P_{1,2}$, $P_{1,3}$ and $P_{1,4}$. A first instance of the producer $P_{1,1}$ exists on a first service host, $SH_1$; a second instance of the producer $P_{1,2}$ exists on a second Service Host, $SH_2$, and a third service host, $SH_3$ host a third and a fourth instances of the producer, $P_{1,3}$ and $P_{1,4}$. So when the single instance of the consumer $C_{1,1}$ aims to reach the producer, two decision will need to be made to decide to which producer instance a consumer request should be routed to:

1) At the arrival of a consumer request at an SCP's ingress point, an SCP must decide which egress point to choose from all possible egress points.
2) At the arrival of a consumer request packet at an SCP's egress point, an SCP must decide which instance to use that should serve the consumer's request, assuming there is more than one producer instance to choose from. In case of third Service Host $SH_3$, the SCP has two producer instances, $P_{1,3}$ and $P_{1,4}$, to choose from which illustrates the instance selection decision.

In the Document 3GPP, TS23.501, Release 17, section E1, four communication models (Model A, B, C and D) are defined how consumers and producers may communicate with each other. In all communication models, the NRF may be at least part of this interaction either by a direct query by the consumer or through a delegated discovery. However, as the NRF is a 5GC NF itself and since cloud native services may only implement logic to handle requests and responses related to providing the service to the end user (e.g., consumer), adding routing logic or other logic beyond the nature of the service it supports may contradict the nature of SBA and its cloud native proposition. Its cloud native proposition may (e.g., clearly) separate orchestration, routing and monitoring from the microservices (5GC) that implement control plane functionality to handle WTRU attachment, session establishment and mobility requests (among others). As the NRF (as a 5GC NF) may make the routing decision with the SCP executing it, the cloud native proposition may not be fulfilled. Furthermore, in multi-vendor, multi-site scenarios, an NRF from Vendor A might not make the most appropriate decision on where to route consumer requests to when NFs are realised a set of microservices rather complex in their performance. Thus, as the SCP does not have an interface to control the Service Host routing and instance selection policies, the cloud native proposition of a 5G system may lack key architectural innovations to fully adopt the cloud principles SBA was supposed to bring.

Example of Programmable Interface for SCP

In one embodiment, a programmable interface for SCP, with NbR as an example, may communicate preferences for Service Host routing and instance selection combined with approaches to programmatically define affinities between consumer and producer. In one embodiment, NbR is used as a way of example, but any of the existing SCP deployment models may be applicable. Furthermore, in one embodiment, a NF, or NF Service may reside anywhere in the network, including a WTRU, a network node, and therefore the principles and concepts outlined in any embodiments may apply equally to all NF/NF services regardless of its location within the cellular network, which includes WTRU, network node, access network and core network.

An affinity defines how long, and under which condition(s), an SCP keeps consumer and producer instances affiliated with each other beyond a single HTTP transaction (request/response). This is to avoid constant state transfer to new producer instances of the same type but for the same WTRU context.

One embodiment may follow the cloud native paradigm whereby software components that implement a service, (e.g., 5G Core Network Functions), may not have any additional code that takes care of functionality other than of handling wireless network (e.g., 5G) control plane requests and responses. Also, this goes hand in hand with the assumption that 5GC NFs are implemented as microservices following the 12-factor app methodology for scaling up and down based on demand and necessity. As 3GPP has specified the SCP for routing packets between SBI-enabled 5GC NFs, a programmable interface may expose by the SCP to control how consumer requests are routed and what affinity consumer and producer instances have. Affinity information may be pre-configured by the programmable interface.

Affinity here may be defined as the ability to establish a rather long-lived relationship between (e.g., specific) consumer and producer instances to avoid any consumer or producer instance to retrieve state first to handle request/responses. Retrieving state first may (e.g., ultimately) introduce unnecessary delays in the control plane when each producer and consumer instance is presented with zero state to handle any transaction.

Furthermore, in the context of cloud native service orchestration, the NRF functionality used to determine which producer, producer instance or set of producer instances a consumer may use, may be moved (e.g., entirely) into the SCP. The NRF functionality may be moved into the SCP by removing any communication between consumers and NRF related to identifying which SCP and producer (instance/set of instances) to be used. As a non-limited example, identifying which SCP and producer to be used may be related to binding establishment between SCPs and NF/NF service producers such that fulfilling the cloud native promise.

Example of Programmable Affinity Interface Specification

Figure 6:
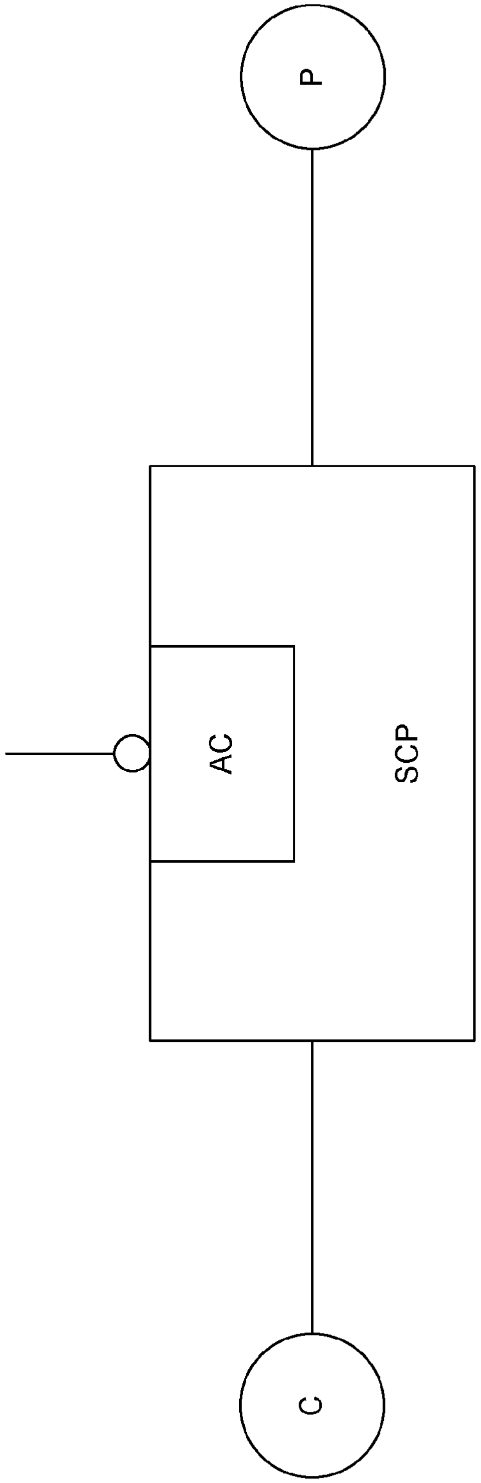
FIG. 6 is a diagram illustrating an example of a programmable affinity interface between a consumer and a producer according to one embodiment.

In one embodiment, the SCP interface may be specified allowing to programmatically define the routing, producer instance selection and affinity policies for a wireless (e.g., a specific 5GC) NF producer. The interface offered by the SCP follows a modem CRUD or RESTful methodology with JSON-encoded payload. Table 1 provides a non-limited example of key fields foreseen to be communicated towards the SCP. As shown in FIG. 6, a programmable affinity interface between a consumer (e.g., function) and a producer (e.g., function), may be a single service endpoint exposed by an SCP, realized by a component entitled Affinity Controller (AC). It is expected that all SCP deployment options realize an AC based on the interface specification described hereafter.

The AC API may offer to configure the affinities for a (e.g., specific) NF identified through an identifier. Following the convention of cloud realizations, the NF identifier may be a Fully Qualified Domain Name (FQDN). Based on this information the AC may allow to control any of the following affinity categories: routing, instance selection, affinity type and the context of the affinity. Each field is explained in further detail in their respective sub-sections hereafter.

TABLE 1

Affinity Interface Specification

| Field Value | Type | Description |
|---|---|---|
| network_function_id | string | The NF identifier for which the request may be fulfilled. The ID identifying may be a Fully Qualified Domain Name (FQDN) |

TABLE 1-continued

| Affinity Interface Specification | | |
|---|---|---|
| Field Value | Type | Description |
| routing_policy | string | The desired routing policy, as provided in Table 2 |
| selection_policy | string | The desired instance selection policy, as provided in Table 4 |
| affinity_policy | string | The desired affinity policy using the values provided in Table 5 |
| context | string | The desired context using the values provided in Table 6 |

Routing Policy

Assuming the SCP operates over a network topology with more than one link and two or more Service Hosts where consumer and producer instances are running, the SCP may decide which path through the network the HTTP transaction should traverse. If more than one Service Host exists at different locations in the network topology with the same producer type (NF), the SCP must also decide which Service Host to choose. This is what the routing policy allows to control externally. Table 2 provides a non-limited example of routing policies that may be available to a programmable affinity interface.

TABLE 2

| Routing Policies Available to the Programmable Affinity Interface | | |
|---|---|---|
| Field Value | Type | Description |
| shortest_path | string | This may define a shortest path routing policy where the path may be determined by the number of hops in the network topology. If there is more than one possibility due to identical number of hops, the SCP may decide which one to use through an internal deterministic procedure. |
| constraint_based | string | This may define a constraint-based routing policy with an additional argument, as defined in Table 3. |

For constraint-based routing, the SCP may offer a range of parameters to utilize, allowing to select the most appropriate Service Host. Non-limited example of possible constraint options is provided in Table 3 and may be treated as exemplary values. Essentially, ever single data point that may be monitored on a compute host may be interpreted as a constraint and fed into as an option to the constraint-based routing policy.

TABLE 3

| Constraint-based Routing Policies | |
|---|---|
| Field Value | Description |
| cpu_load | The SCP may pick the Service Host with the lowest average CPU load |
| network_load | The SCP may pick the Service Host with the lowest average network |
| open_file_descriptors | The SCP may pick the Service Host with the lowest average number of open file descriptors (communication sockets in particular). |

Instance Selection Policy

Once the Service Host has been selected, the SCP may take the decision to which producer instance the consumer request may be given to. Assuming there is more than one instance of the same producer type available, a range of options are available, as provided as a non-limited example in Table 4.

TABLE 4

| Example Instance Selection Policies | |
|---|---|
| Field Value | Description |
| round_robin | The SCP may choose a producer instance based on an internal list of available producers registered under the needed NF identifier |

TABLE 4-continued

| Example Instance Selection Policies | |
|---|---|
| Field Value | Description |
| | (e.g., FQDN). The selection may be conducted on a round robin basis over the list of suitable producers where each consumer request for a new context is given to the next producer instance in the list. Once a producer instance is chosen, it may be placed at the end of the list. |
| weighted_round_robin | The SCP may choose a producer instance based on an internal list of available producers registered under the needed NF identifier (i.e., FQDN). The selection may be conducted on a weighted round robin basis over the list of suitable producer instances where each consumer request for a new context may be given to the next producer instance in the list. Once a producer instance is chosen, it may be placed towards the end of the list using a probabilistic approach. |
| cpu_load | The SCP may choose a producer instance based on an internal list of available producers registered under the needed NF identifier (i.e., FQDN). The ordered list may comprise all suitable producer instances and their average CPU load where each consumer request for a new context may be given to the producer instance with the lowest CPU load. |

Affinity Policies

Once the Service Host and NF instance has been selected, the affinity policy may be chosen instructing the SCP how many consecutive HTTP transactions should be given to the same instance before choosing another one based on the instance selection policy.

TABLE 5

| Affinity Policies | |
|---|---|
| Field Value | Description |
| pinned | The SCP may ensure that any new consumer request that arrives from the same consumer instance will be affiliated with a specific producer instance and will be pinned to this one until the consumer stops communicating. |
| sticky | The SCP ensures that any new consumer request that does not belong to the same context, will be affiliated with a specific producer instance and will stick to this one until the UE context has been finished, e.g., PDU session establishment. |
| time_limited | The SCP ensures that any new consecutive consumer request for the same context will be given to the same producer instance for the time provided. |
| none | The SCP will apply the chosen instance selection policy without any further affinity policy applied for consecutive transactions. |

Context

The (e.g., most critical) part for enforcing the affinity policies listed in Table 5 may be the context under which they operate. As SBI-enabled NFs may utilize HTTP with TLS, the SCP may not have access to the actual HTTP header or even payload to find information related to the control plane signaling. The context an SCP may possibly understand may be related to information accessible outside the HTTP header information. However, in case the SCP has access to the TLS payloads through certificate sharing, the context may be more fine-tuned towards the actual transaction(s) where a single transaction is a single HTTP request/response communication between a consumer and producer. Note, the non-limited examples of listed context fields in Table 6 may be by no means complete and serve as exemplary fields to demonstrate how a context may impact the affinity.

TABLE 6

| Context for Affinity | | |
|---|---|---|
| Field | SCP Support | Description |
| consumer_instance | Mandatory | The context the SCP may apply to the chosen affinity policy may be related to a specific consumer instance. An SCP may identify a consumer instance through a range of information, e.g., its MAC/IP address, source transport layer port, transport protocol (TCP for HTTP/2 or UDP for HTTP/3 and above) or any combination of that information. |

TABLE 6-continued

| Context for Affinity | | |
|---|---|---|
| Field | SCP Support | Description |
| service_host | Mandatory | The context the SCP may apply to the chosen affinity policy may be related to a specific service host identified through its MAC and/or IP address. |
| pdu_session | Optional | The context the SCP may apply to the chose affinity policy may be related to a PDU session identified through accessing the transactions between consumers and producers. |

Exemplary Usage of Affinity Controller API

Example 1 and example 2 are two non-limited examples of the usage of the AC API using JSON to encode the information from Table 1 through Table 6. Example 1 illustrates the (e.g., most) basic configuration of an SCP for the producer registered under nfl.foo.com. The routing policy may be chosen to be shortest path with a weighted round robin instance selection one. The affinity may be set to none meaning the SCP will use the selection policy for every consecutive HTTP request towards the producer of nfl.foo.com after applying shortest path. As a result of the chosen affinity policy, the context field may be not required and may be left out in this JSON payload.

Example 1

```
{
  "network_function_id" = "nf1.foo.com",
  "routing_policy" = "shortest_path",
  "selection_policy" = "weighted_round_robin",
  "affinity_policy" = "none"
}
```

A more advanced scenario with more control over the SCP's routing and affinity behaviour may be provided in Example 2 below. The routing policy may become constraint-based with the field constraints being used to indicate which constraints the SCP may be supposed to take into account to make the routing decision to which Service Host the consumer request may be sent. As the selection policy round robin may be chosen with the affinity policy sticky, the context for the affinity policy may be configured to be the consumer instance.

Example 2

```
{
  "network_function_id" = "nf1.foo.com",
  "routing_policy" = "constraint_based",
  "constraints" = "open_file_descriptors, cpu, net",
  "selection_policy" = "round_robin",
  "affinity_policy" = "sticky",
  "context" = "consumer_instance"
}
```

Example of Programmable Affinity API Realisation for NbR-Based SCPs

Figure 7:
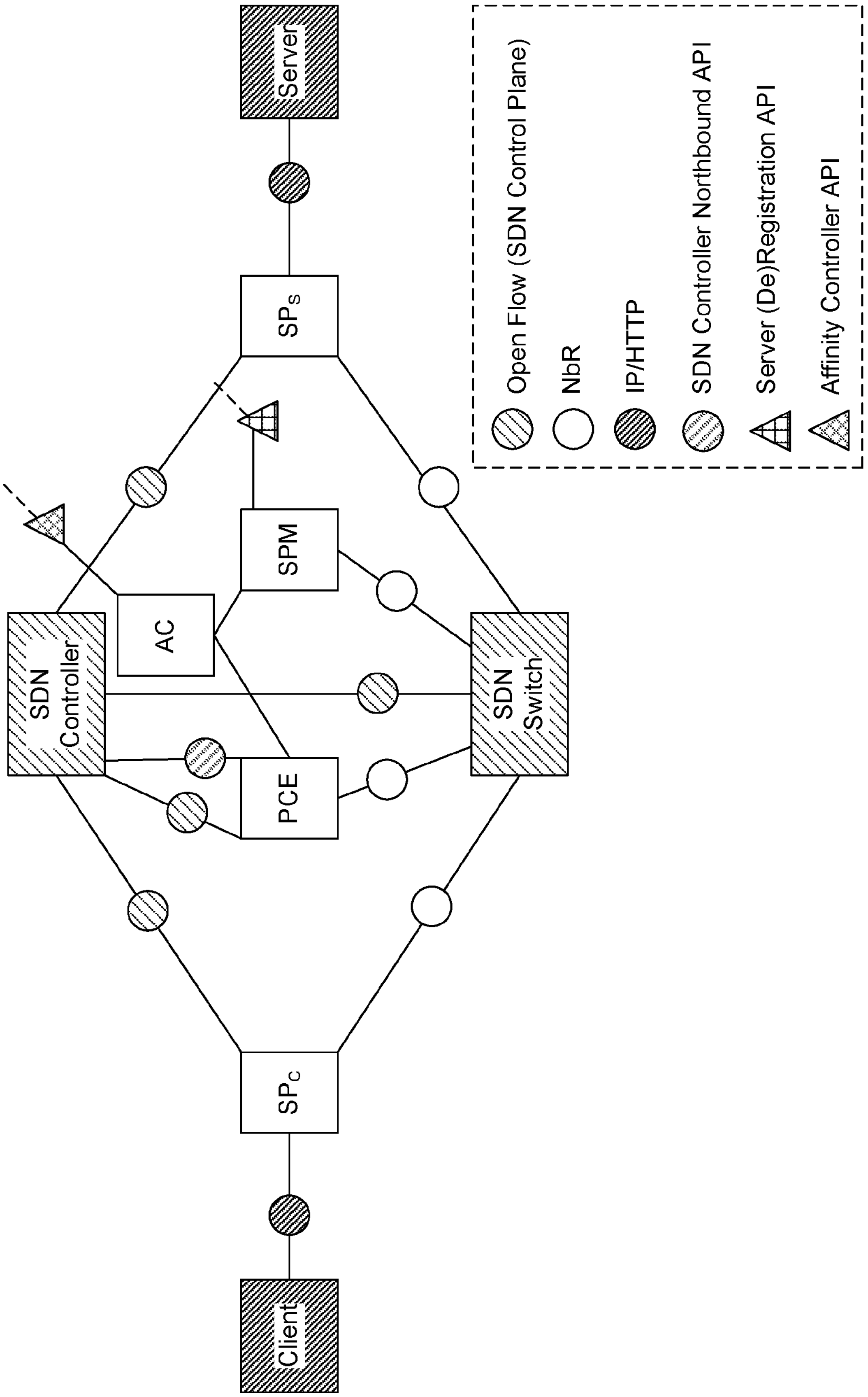
FIG. 7 is a diagram illustrating an example of a Named-based Routing architecture extended by an affinity controller according to one embodiment.

FIG. 7 shows the extended NbR architecture with the AC component exposing the affinity API. For NbR, the AC may behave as a proxy and may distribute the affinity information to the PCE as well as to the SPM. Both interfaces from the AC into the PCE and SPM may be also following a CRUD or RESTful realization and it may be expected that the same syntax as for the AC API is being used allowing the AC to act very similar to a web proxy.

Figure 8:
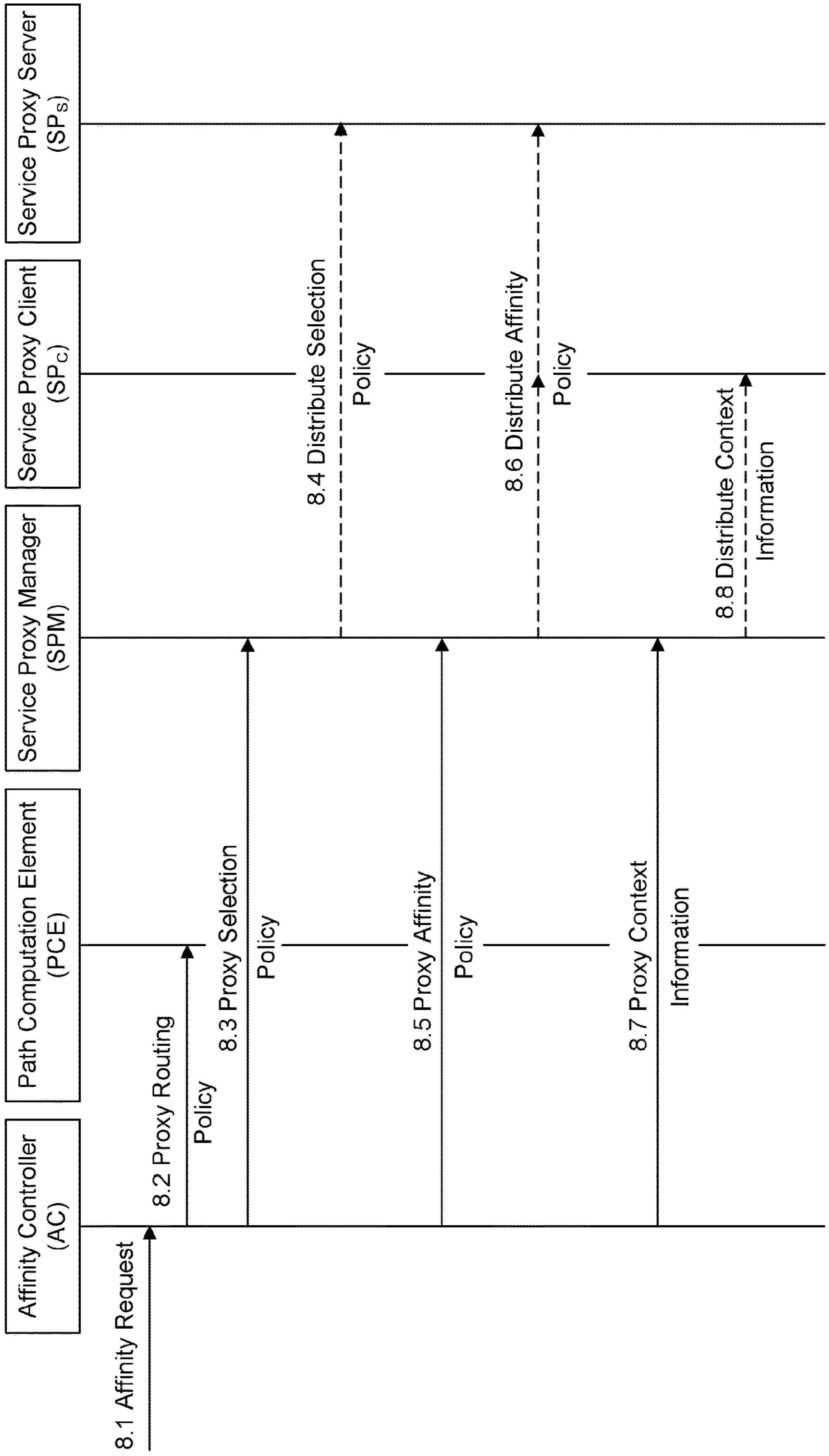
FIG. 8 is an example of a message sequence chart for affinity controller application program interface integration with named-based routing system components.

A non-limited example of a message sequence chart illustrating the communication between the AC and the NbR system components is depicted in FIG. 8 and explained in further detail.

At Step 8.1, an authoritative (e.g., network) entity may communicate a new affinity request to the AC comprising the information as defined above, from Table 1 to Table 6.

At Step 8.2, the AC may extract the routing policy and constraints (if available) and may communicate this to the PCE. The PCE's interface may follow the same specification as the affinity interface with the exception that it may only support the fields routing_policy and constraints.

At Step 8.3, the AC may extract the instance selection policy from the affinity request in Step 8.1 and may communicate this to the SPM. The SPM's interface may follow the same specification as the affinity interface with the exception that it may only support the fields selection policy, affinity_policy and affinity context.

At Step 8.4, the SPM may distribute the instance selection policy to all operational $SP_S$s. SPs may implement the realization of the selection policies.

At Step 8.5, the AC may extract the affinity policy from the affinity request in Step 8.1 and may communicate this to the SPM.

At Step 8.6, the SPM may transmit the affinity policy to all operational $SP_C$s and $SP_S$s. As the affinity may be implemented on both ends of the NbR systems where IP traffic is terminated, both SP types may require this information.

At Step 8.7, the AC may extract the context information from the affinity request in Step 8.1 and may communicate this to the SPM.

At Step 8.8, the SPM may distribute the context information to all operational $SP_C$s. As the context information may be applied at all ingress points into the NbR system, $SP_C$s may implement this behavior.

Example of Artificial Intelligence/Machine Learning (AI/ML)-Driven Usage of Affinity Controller While the AC provides an interface to programmatically define the affinity between consumer and producer instances, the decision on what policies to select may be foreseen to be fulfilled by a managing component that has deeper insights into the behavior and performance of consumer and producers—even at run time. Such component may be entitled Affinity Manager (AM) as a generic term. The AM may reside as a dedicated component next to the SCP with fill telemetry access to all required data points. Alternatively, the AM may also query a network data analytics function (NWDAF) regarding information about SBI-enabled 5G NFs and their performance to make a decision on which affinity policy to pick.

Example of Determination of Policies in Producers

WTRUs may be upgraded in their Non-Access Stratum procedures to utilize HTTP and to act as a consumer or as a producer, depending on the NAS procedure. Such behavior may refer to as NAS-as-a-service (NASaaS).

WTRU route selection policy (URSP) rules may establish user plane communication and control plane communication. In case the WTRU acts as a producer, affinity information as described above will need to be determined and communicated by the WTRU towards the affinity controller. WTRU may use WTRU route selection policies pre-configured in a universal subscriber identity module (USIM). Such configuration may be provided by an operator assuming the operator is fully aware of how NASaaS procedures are implemented in software on the WTRU NAS application ID and some additional fields in a route selection descriptor may allow a NAS software stack to implement a NAS layer to communicate URSPs toward the SCP. If the operator has not provided the WTRU with URSPs on the USIM, the NAS software may be used to communicate the various policies to the affinity controller (e.g., as part of the SCP) as preconfigured URSPs. Affinity policies, instance selection policy, and routing policy may be added to the route selection descriptor.

URSPs may be part of a NASaaS table such that affinity information (e.g., network function identifier, a routing policy, a selection policy, affinity policy, and a context of affinity for a server function) may be determined based on the URSP descriptor Table 7 shows URSP rules including affinity policies

TABLE 7

| WTRU route selection policy rules including affinity policies |
|---|
| Rule Precedence |
| Traffic descriptor component comprising: |
| Application descriptors |
| IP descriptors |
| Domain descriptors |
| Non-IP descriptors |
| DNN |
| Connection Capabilities |
| List of Route Selection Descriptors including one or more: |
| Route Selection Descriptor comprising: |
| Route Selection Descriptor Precedence |
| One or more Route selection components comprising at least one of: |
| SSC Mode Selection |
| Network Slice Selection |
| DNN Selection |
| PDU Session Type Selection |
| Non-Seamless Offload indication |
| Access Type preference |
| Routing, Instance Selection and Affinity Policies. |
| Context of Affinity |
| Route Selection Validation Criteria comprising |
| Time Window |
| Location Criteria |

Example of Utilizing USRPs to Perform Affinity-Based Communication

Figure 9:
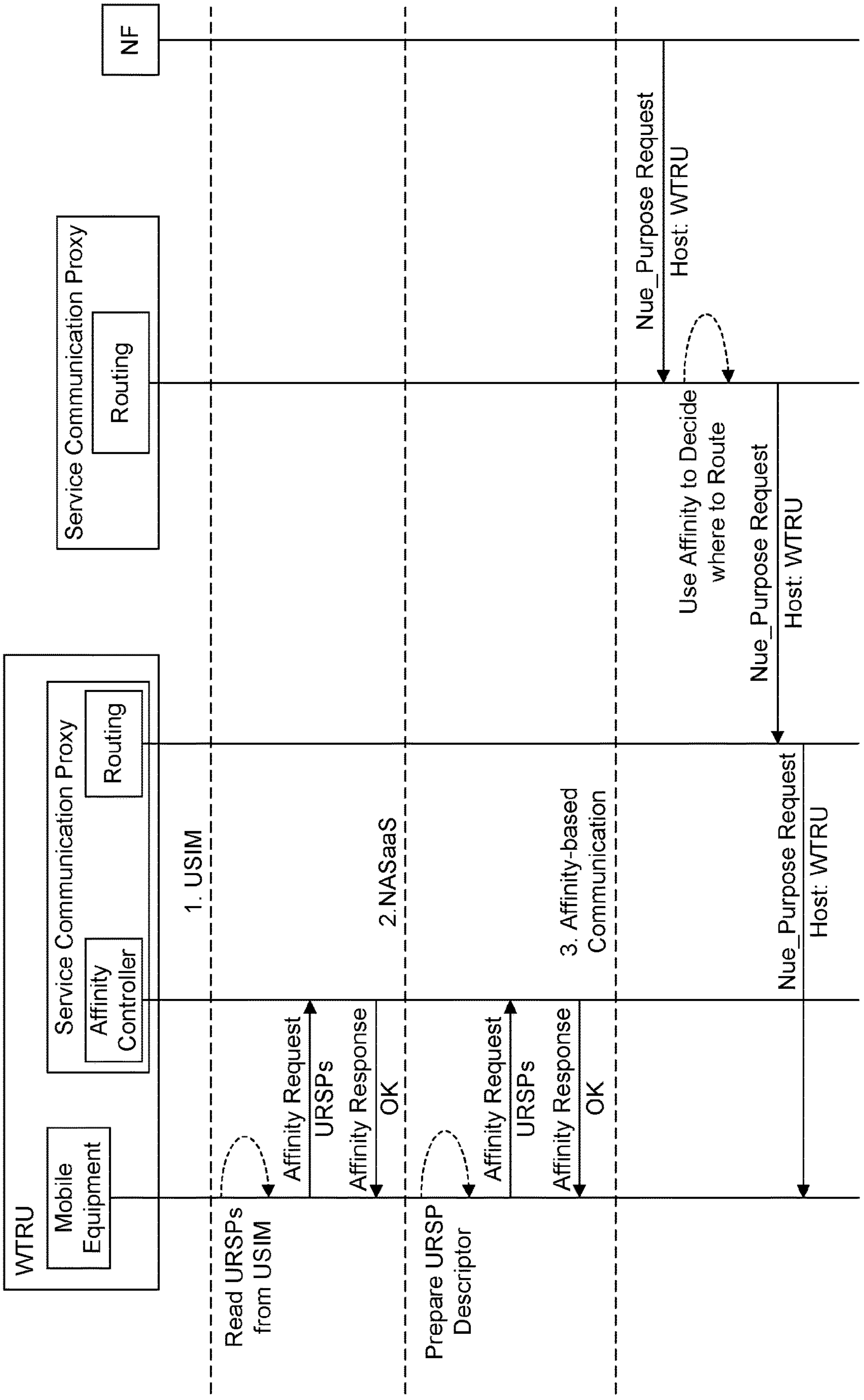
FIG. 9 is an example of a message sequence chart on determination of affinity information and affinity-based communication via WTRU route selection policies.

FIG. 9 depicts examples of determination of affinity information and affinity-based communication via WTRU route selection policies. Referring to FIG. 9, the WTRU may host a mobile equipment software and may also host the affinity controller as part of the service communication proxy.

At step 1, the WTRU may obtain the URSP from the USIM before communicating the USRPs to the affinity controller.

In addition to step 1, as described above, according to the messages under step 2, (e.g., if the USIM does not comprise URSPs), the URSPs may be determined by the NASaaS software implementation and the URSPs may be communicated to the affinity controller.

According to the messages under step 3, the SCP may use new policies to communicate to the affinity controller via USRPs. The exemplary request from the consumer, called "Nue_Purpose Request", may be a first or a consecutive request message from the specific consumer instance toward the WTRU. It may be the routing policies, the instance, the affinity policies and the context policies the SCP may use to determine the actual producer instance that will serve the request.

Figure 10:
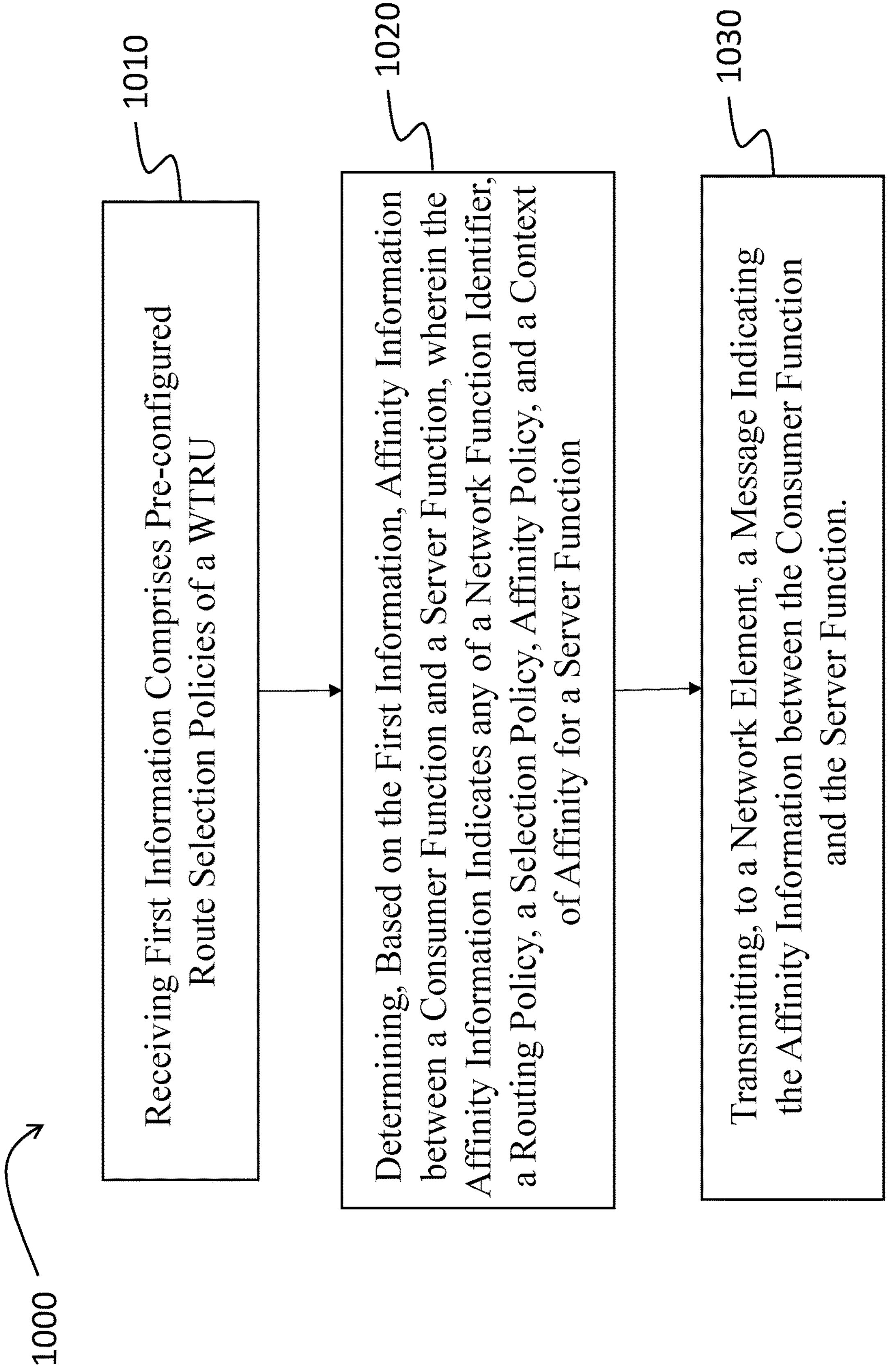
FIG. 10 is a flowchart illustrating an example of a method implemented in a WTRU for improving communication between a server function and a consumer function.

Referring to FIG. 10, an example of a method 1000 implemented in a WTRU for improving communication between a server function and a consumer function. At step 1010, the WTRU may receive first information comprises pre-configured route selection policies of the WTRU. The route selection policies of the WTRU may have been pre-configured in a USIM by an operator. The route selection policies of the WTRU may have been (e.g., manually) configured by a NASaaS application on the WTRU as part of the mobile equipment. At step 1020, the method 1000 may comprise a step of determining, based on the first information, affinity information between a consumer function and a server function, wherein the affinity information indicates any of a network function identifier, a routing policy, a selection policy, affinity policy, and a context of affinity for a server function. At step 1030, the method 1000 may comprise a step of transmitting, to a network element, a message indicating the affinity information between the consumer function and the server function.

According to the entire description above, it has to be noted that the server function may be executed on the WTRU.

CONCLUSION

Although features and elements are provided above in particular combinations, one of ordinary skill in the art will appreciate that each feature or element can be used alone or in any combination with the other features and elements. The present disclosure is not to be limited in terms of the particular embodiments described in this application, which are intended as illustrations of various aspects. Many modifications and variations may be made without departing from its spirit and scope, as will be apparent to those skilled in the art. No element, act, or instruction used in the description of the present application should be construed as critical or essential to the invention unless explicitly provided as such. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods or systems.

The foregoing embodiments are discussed, for simplicity, with regard to the terminology and structure of infrared capable devices, i.e., infrared emitters and receivers. However, the embodiments discussed are not limited to these systems but may be applied to other systems that use other forms of electromagnetic waves or non-electromagnetic waves such as acoustic waves.

It is also to be understood that the terminology used herein is for the purpose of describing particular embodiments only and is not intended to be limiting. As used herein, the term "video" or the term "imagery" may mean any of a snapshot, single image and/or multiple images displayed over a time basis. As another example, when referred to herein, the terms "user equipment" and its abbreviation "UE", the term "remote" and/or the terms "head mounted display" or its abbreviation "HMD" may mean or include (i) a wireless transmit and/or receive unit (WTRU); (ii) any of a number of embodiments of a WTRU; (iii) a wireless-capable and/or wired-capable (e.g., tetherable) device configured with, inter alia, some or all structures and functionality of a WTRU; (iii) a wireless-capable and/or wired-capable device configured with less than all structures and functionality of a WTRU; or (iv) the like. Details of an example WTRU, which may be representative of any WTRU recited herein, are provided herein with respect to FIGS. 1A-1D. As another example, various disclosed embodiments herein supra and infra are described as utilizing a head mounted display. Those skilled in the art will recognize that a device other than the head mounted display may be utilized and some or all of the disclosure and various disclosed embodiments can be modified accordingly without undue experimentation. Examples of such other device may include a drone or other device configured to stream information for providing the adapted reality experience.

In addition, the methods provided herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

Variations of the method, apparatus and system provided above are possible without departing from the scope of the invention. In view of the wide variety of embodiments that can be applied, it should be understood that the illustrated embodiments are examples only, and should not be taken as limiting the scope of the following claims. For instance, the embodiments provided herein include handheld devices, which may include or be utilized with any appropriate voltage source, such as a battery and the like, providing any appropriate voltage.

Moreover, in the embodiments provided above, processing platforms, computing systems, controllers, and other devices that include processors are noted. These devices may include at least one Central Processing Unit ("CPU") and memory. In accordance with the practices of persons skilled in the art of computer programming, reference to acts and symbolic representations of operations or instructions may be performed by the various CPUs and memories. Such acts and operations or instructions may be referred to as being "executed," "computer executed" or "CPU executed."

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to or representative of the data bits. It should be understood that the embodiments are not limited to the above-mentioned platforms or CPUs and that other platforms and CPUs may support the provided methods.

The data bits may also be maintained on a computer readable medium including magnetic disks, optical disks, and any other volatile (e.g., Random Access Memory (RAM)) or non-volatile (e.g., Read-Only Memory (ROM)) mass storage system readable by the CPU. The computer readable medium may include cooperating or interconnected computer readable medium, which exist exclusively on the processing system or are distributed among multiple interconnected processing systems that may be local or remote to the processing system. It should be understood that the embodiments are not limited to the above-mentioned memories and that other platforms and memories may support the provided methods.

In an illustrative embodiment, any of the operations, processes, etc. described herein may be implemented as computer-readable instructions stored on a computer-readable medium. The computer-readable instructions may be executed by a processor of a mobile unit, a network element, and/or any other computing device.

There is little distinction left between hardware and software implementations of aspects of systems. The use of hardware or software is generally (but not always, in that in certain contexts the choice between hardware and software may become significant) a design choice representing cost versus efficiency tradeoffs. There may be various vehicles by which processes and/or systems and/or other technologies described herein may be effected (e.g., hardware, software, and/or firmware), and the preferred vehicle may vary with the context in which the processes and/or systems and/or other technologies are deployed. For example, if an implementer determines that speed and accuracy are paramount, the implementer may opt for a mainly hardware and/or firmware vehicle. If flexibility is paramount, the implementer may opt for a mainly software implementation. Alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples include one or more functions and/or operations, it will be understood by those within the art that each function and/or operation within such block diagrams, flowcharts, or examples may be implemented, individually and/or collectively, by a wide range of hardware, software, firmware, or virtually any combination thereof. In an embodiment, several portions of the subject matter described herein may be implemented via Application Specific Integrated Circuits (ASICs), Field Programmable Gate Arrays (FPGAs), digital signal processors (DSPs), and/or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein may be distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc., and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a typical data processing system may generally include one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity, control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components included within, or connected with, different other components. It is to be understood that such depicted architectures are merely examples, and that in fact many other architectures may be implemented which achieve the same functionality. In a conceptual sense, any arrangement of components to achieve the same functionality is effectively "associated" such that the desired functionality may be achieved. Hence, any two components herein combined to achieve a particular functionality may be seen as "associated with" each other such that the desired functionality is achieved, irrespective of architectures or intermedial components. Likewise, any two components so associated may also be viewed as being "operably connected", or "operably coupled", to each other to achieve the desired functionality, and any two components capable of being so associated may also be viewed as being "operably couplable" to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, where only one item is intended, the term "single" or similar language may be used. As an aid to understanding, the following appended claims and/or the descriptions herein may include usage of the introductory phrases "at least one" and "one or more" to introduce claim recitations. However, the use of such phrases should not be construed to imply that the introduction of a claim recitation by the indefinite articles "a" or "an" limits any particular claim including such introduced claim recitation to embodiments including only one such recitation, even when the same claim includes the introductory phrases "one or more" or "at least one" and indefinite articles such as "a" or "an" (e.g., "a" and/or "an" should be interpreted to mean "at least one" or "one or more"). The same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, the terms "any of" followed by a listing of a plurality of items and/or a plurality of categories of items, as used herein, are intended to include "any of," "any combination of," "any multiple of," and/or "any combination of multiples of" the items and/or the categories of items, individually or in conjunction with other items and/or other categories of items. Moreover, as used herein, the term "set" is intended to include any number of items, including zero. Additionally, as used herein, the term "number" is intended to include any number, including zero. And the term "multiple", as used herein, is intended to be synonymous with "a plurality".

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein may be readily broken down into a lower third, middle third and upper third, etc. As will also be understood by one skilled in the art all language such as "up to," "at least," "greater than," "less than," and the like includes the number recited and refers to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Moreover, the claims should not be read as limited to the provided order or elements unless stated to that effect. In addition, use of the terms "means for" in any claim is intended to invoke 35 U.S.C. § 112, ¶6 or means-plus-function claim format, and any claim without the terms "means for" is not so intended.

What is claimed is:

1. A method, implemented in a wireless transmit/receive unit, (WTRU), comprising:

receiving a first message comprising first information indicating one or more pre-configured route selection policies of the WTRU;

determining, based on the first information, affinity information between a consumer function and a server function, wherein the affinity information indicates any of a network function identifier, a routing policy, a selection policy, affinity policy, and a context of affinity for a server function, wherein the affinity information indicates how long and under which one or more conditions a service communication proxy keeps consumer and producer instances affiliated with each other beyond a single hypertext transfer protocol (HTTP) transaction, and wherein the single HTTP transaction comprises an HTTP request and response; and transmitting, from the WTRU, to a network element, a second message comprising the affinity information associated with an affiliation between the consumer function and the server function.

2. The method of claim 1, wherein the server function is executed on the WTRU.

3. The method of claim 1, wherein the consumer function is configured to transmit request messages to the WTRU.

4. The method of claim 1, wherein the server function is configured to response to request messages received by the WTRU.

5. The method of claim 1, wherein communication from the server function to the WTRU is based on any of application layer protocol.

6. The method of claim 1, wherein communication from the consumer function to the WTRU is based on any of application layer protocol.

7. The method of claim 1, wherein the consumer function communicates using non access stratum procedures.

8. The method of claim 1, wherein the server function communicates using non access stratum procedures.

9. The method of claim 1, wherein the selection policy indicates under which condition an instance of a server function is selected, and wherein the server function is implemented as one or more instances.

10. A wireless transmit/receive unit WTRU comprising a processor, a transmitter, a receiver and memory, configured to:

receive a first message comprising first information indicating one or more pre-configured route selection policies of the WTRU;

determine, based on the first information, affinity information between a consumer function and a server function, wherein the affinity information indicates any of a network function identifier, a routing policy, a selection policy, affinity policy, and a context of affinity for a server function, wherein the affinity information indicates how long and under which one or more conditions a service communication proxy keeps consumer and producer instances affiliated with each other beyond a single hypertext transfer protocol (HTTP) transaction, and wherein the single HTTP transaction comprises an HTTP request and response; and transmit, from the WTRU, to a network element, a second message comprising the affinity information associated with an affiliation between the consumer function and the server function.

11. The WTRU of claim 10, wherein the server function is executed on the WTRU.

12. The WTRU of claim 10, wherein the consumer function is configured to transmit request messages to the WTRU.

13. The WTRU of claim 10, wherein the server function is configured to response to request messages received by the WTRU.

14. The WTRU of claim 10, wherein communication from the server function to the WTRU is based on any of application layer protocol.

15. The WTRU of claim 10, wherein communication from the consumer function to the WTRU is based on any of application layer protocol.

16. The WTRU of claim 10, wherein the consumer function communicates using non access stratum procedures.

17. The WTRU of claim 10, wherein the server function communicates using non access stratum procedures.

18. The WTRU of claim 10, wherein the selection policy indicates under which condition an instance of a server function is selected, and wherein the server function is implemented as one or more instances.

19. The method of claim 1, wherein the WTRU comprises one of the consumer function or the server function.

20. The WTRU of claim 10, comprising one of the customer function or the server function.

* * * * *